United States Patent Office 3,655,832
Patented Apr. 11, 1972

3,655,832
POLYCARBOCYCLIC PHENOLIC PHOSPHITES
Otto S. Kauder, Jamaica, William E. Leistner, Brooklyn, and Arthur C. Hecker, Forest Hills, N.Y., assignors to Argus Chemical Corporation, Brooklyn, N.Y.
No Drawing. Continuation-in-part of applications Ser. No. 160,237, Dec. 18, 1961, and Ser. No. 240,754, Nov. 28, 1962, and a division of application Ser. No. 569,115, Aug. 1, 1966, now Patent No. 3,476,699. This application Feb. 18, 1969, Ser. No. 871,178
Int. Cl. C07d 105/04; C07f 9/12
U.S. Cl. 260—930
15 Claims

ABSTRACT OF THE DISCLOSURE

Organic phosphites are provided having in the molecule at least one polycarbocyclic phenolic group for each phosphite group, such polycarbocyclic phenolic group having from one to about thirty carbon atoms per phenolic group, and having the formula:

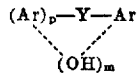

and the phosphite having at least one aliphatic and/or cycloaliphatic group and having the formula:

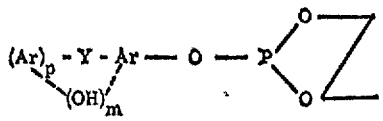

wherein Ar is a carbocyclic aromatic nucleus and at least one Ar nucleus has a phenolic hydroxyl group, $m$ has a value from one to about five; $p$ has a value from two to four; and $Z$ is taken in sufficient number to satisfy the valences of the two phosphite oxygen atoms, includes at least one aliphatic or cycloaliphatic group; and is selected from the group consisting of hydrogen; monovalent and bivalent aliphatic, aromatic, and cycloaliphatic hydrocarbon radicals having from about one to about thirty carbon atoms; and monovalent and bivalent phenolic groups having from one to about thirty carbon atoms per phenolic hydroxyl group, and selected from the group consisting of

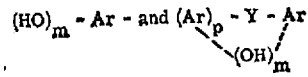

which in polymeric phosphites are linked to additional phosphite groups, such phosphites containing at least one aliphatic or cycloaliphatic group for each one to ten phosphite groups; and Y is a linking nucleus selected from the group consisting of trivalent, tetravalent and pentavalent aliphatic, cycloaliphatic, and aromatic hydrocarbon groups, attached to each Ar group through a carbon atom not a member of an aromatic ring, and such aliphatic radicals including carboxylic acid ester groups, and having from one to about thirty-three carbon atoms.

This application is a continuation-in-part of application Ser. No. 160,237 filed Dec. 18, 1961, now abandoned and application Ser. No. 240,754 filed Nov. 28, 1962, now abandoned and a division of Ser. No. 569,115, filed Aug. 1, 1966, now U.S. Pat. No. 3,476,699, patented Nov. 4, 1969.

This invention relates to new organic phosphites, and to synthetic resin and particularly olefin polymer and polyvinyl chloride resin compositions containing the same, and having, as a result, an improved resistance to deterioration, evidenced especially by improved long term stability, when heated at elevated temperatures.

Many organic phosphites have been proposed as stabilizers for polyvinyl chloride resins, and are employed either alone or in conjunction with other stabilizing compounds, such as polyvalent metal salts of fatty acids and alkyl phenols. Such phosphite stabilizers normally contain alkyl or aryl radicals in sufficient number to satisfy the three valences of the phosphite, and typical phosphites are described in the patent literature, for example, U.S. Pats. Nos. 2,564,646, to Leistner et al., dated Aug. 14, 1951, 2,716,092 to Leistner et al., dated Aug. 23, 1955, and 2,997,454 to Leistner et al., dated Aug. 22, 1961. Phosphites are also employed in conjunction with other stabilizers such as a polyhydric phenol in the stabilization of polypropylene and other polyolefins against degradation upon heating or aging under atmospheric conditions. The polyhydric phenol is thought to function as an antioxidant in such combinations. In many cases, it is also desirable to incorporate an antioxidant of this type in polyvinyl chloride resins and other halogen-containing resins. However, the polyhydric phenols are solids and the organic phosphites are liquids, and combinations thereof when sold for use by the converter of the resins are consequently nonhomogeneous slurries. The phenol tends to settle out in the container, and the fact that the composition is in the form of a slurry makes it difficult to incorporate the proper proportions of phenol and phosphite in the resin. Furthermore, phenols have a tendency to impart a dark color to synthetic resins containing them.

In Ser. No. 32,087, filed on May 27, 1960, now U.S. Pat. No. 3,244,650 to Hecker et al., dated Apr. 5, 1966, there is disclosed one method for avoiding the first problem, i.e., the problem of incompatibility and nonhomogeneity, described above, in combining a polyhydric phenol with an organic phosphite, and a salt of an organic acid and a metal of Group II of the Periodic Table. Ser. No. 446,422, filed on Apr. 7, 1965, to Hecker et al., now Pat. No. 3,255,136, dated June 7, 1966, discloses and claims similar combinations including a thiodipropionate. It is there disclosed that by at least partially transesterifying a mixture of the polyhydric phenol and the organic phosphite, a homogeneous product can be obtained.

The importance of phosphites as stabilizers for synthetic resins has led to the development of a large variety of phosphites which are intended to meet one or the other of the problems of homogeneity and compatibility, as well as to improve the stabilizing effectiveness of the phosphite. However, the phosphites which have been proposed have not been entirely successful, partly because of their complicated structure, which makes them costly to prepare, and partly because of their difficulty of preparation. It is important if the phosphite is to be competitive with the simple triphosphites of Pats. Nos. 2,564,646, 2,761,092 and 2,997,454, that it be prepared from readily available and inexpensive starting materials, and that it be prepared by a simple transesterification or equivalent process from the least expensive and most available triphosphite on the market today, triphenyl phosphite.

U.S. Pats. Nos. 3,112,286 to Morris et al., dated Nov. 26, 1963, and 3,167,526 to A. M. Nicholson, dated Jan. 26, 1965, disclose triaryl phosphites, which include among the aryl substituents bisphenyl groups which can contain free phenolic hydroxyl groups. These are simple nonpolymeric phosphites, like the phosphites of Pats. Nos. 2,564,646, 2,716,092 and 2,997,454.

U.S. Pat. No. 2,234,379 to G. D. Martin, dated Mar. 11, 1941, discloses heterocyclic phenylene phosphites in which the phenylene group forms a heterocyclic ring with two oxygen atoms of the phosphite group. These are indicated as useful in the preservation of fatty materials against decomposition or rancidification. U.S. Pat. No. 2,834,798 to Hechenbleikner et al., dated May 13, 1958, discloses similar heterocyclic phosphites, in which the bivalent group is alkylene or mixed alkylene arylene.

Phosphites of a more complicated polymeric structure have been proposed as stabilizers or inhibitors for various types of organic compounds. Most of these materials have a high molecular weight, and exist as viscous liquids or resinous solids. Typical of these materials are the polymeric aromatic phosphites of U.S. Pat. No. 2,612,488 to J. F. Nelson, dated Sept. 30, 1952, and British Pat. No. 676,552, published July 30, 1952, to Standard Oil Development Company. U.S. Pat. No. 2,841,608, to Hechenbleikner et al., dated July 1, 1958, discloses dimeric phosphites in which all of the substituents are aliphatic.

In accordance with the invention, organic phosphites are provided (1) having attached to a phosphite group in the molecule at least one radical selected from the group consisting of aliphatic and cycloaliphatic groups, and (2) having attached to each phosphite group at least one polycarbocyclic aromatic group having the formula:

$$(Ar)_p\text{—}Y\text{—}Ar$$

wherein:

Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic; oxycycloaliphatic, thiocycloaliphatic; heterocyclic; oxyheterocyclic, thioheterocyclic, carbonyl, sulfinyl; and sulfonyl groups. Y cannot be a sulfide group (—S—)$_x$, wherein $x$ is one or more. Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and $p$ is a number, one or greater, and preferably from one to four, which defines the number of Ar groups linked to Y.

The remaining groups of the phosphite are selected from the group consisting of hydrogen, monovalent and bivalent aliphatic, cycloaliphatic, aromatic and heterocyclic groups having from one to about thirty carbon atoms, all of the groups being attached to phosphorus through oxygen.

The phosphites of the invention combine in one molecule the stabilizing effectiveness associated with organic phosphites as well as the antioxidant effectiveness of the phenols. Antioxidant effectiveness is found in phosphite esters having aromatic groups attached directly through oxygen to the phosphorus of the phosphite, whether or not a free phenolic hydroxyl group is present; but compounds having free phenolic hydroxyl groups appear to have an enhanced antioxidant effectiveness, so that preferably at least one of the $(Ar)_p$—Y—Ar groups per molecule has a free phenolic hydroxyl group.

Polymeric phosphites wherein the molecule is made up of a chain of phosphite groups linked to $(Ar)_p$—Y—Ar groups are also contemplated.

These phosphites have been found to be highly effective stabilizers for synthetic resins, particularly for polyvinyl chloride and polyolefins. The effectiveness of these phosphites is at least in part due to the presence in the molecule of both aliphatic or cycloaliphatic and bicyclic aromatic groups.

The compounds of the invention surprisingly are more effective as stabilizers than phosphites and phenols taken in combination, but as separate compounds, in the same relative amounts as the phosphite and phenol moieties of the phosphites of the invention. Apparently, the association of the groups in the same molecule has an enhancing effect. Furthermore, the pressure of at least one aliphatic or cycloaliphatic group attached to a phosphite group in the molecule also has a substantial effect in enhancing the stabilizing effectiveness of the phosphite. Usually, in a molecule containing several phosphite groups there should be at least one aliphatic or cycloaliphatic group attached to phosphorus through oxygen for every ten phosphite groups, and preferably at least one for every eight phosphite groups. The compounds of the invention having two phosphite groups as a minimum per molecule are generally more effective stabilizers than compounds having one phosphite group and the same relative proportion of phenolic groups.

The compounds of the invention are liquids or low melting resinous solids, and are compatible with synthetic resins such as polyvinyl chloride and polyolefins in the proportions required for stabilization.

The organic phosphites of this invention can be defined by the formula:

I 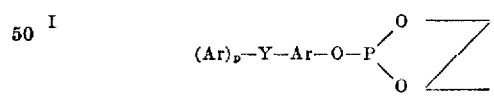

wherein Z is selected from the group consisting of hydrogen and aliphatic, cycloaliphatic, aromatic, heterocyclic, and $(Ar)_p$—Y—Ar groups, taken in sufficient number of satisfy the valences of the two phosphite oxygen atoms. At least one Z group is an aliphatic or cycloaliphatic group, and $p$, Y and Ar are as defined above.

Exemplary of types of phosphites falling within the above general formula are the following:

(1)

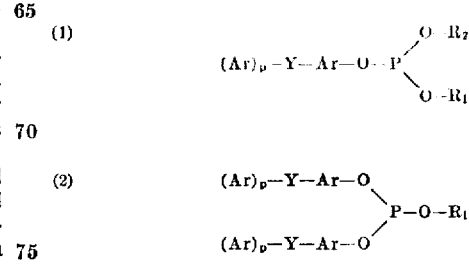

(2)

(3) 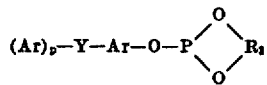

(4) 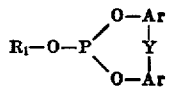

In the above formulae, $R_1$ is a monovalent aliphatic or cycloaliphatic group, $R_2$ is a monovalent aliphatic, cycloaliphatic, aromatic or heterocyclic group, and $R_3$ is a bivalent aliphatic or cycloaliphatic group. Any

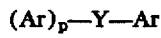

groups can be cross-linked to other phosphite groups.

The polymeric organic phosphite esters have the general formula:

(II)

$$\underset{\diagup}{Z} \diagdown_O^O P-O-Ar-Y- \left[ Ar-\left[-O-P(-O-Ar-Y-Ar-)-\right]_n - O-P \diagdown_O^O \underset{\diagdown}{Z} \right]_{p_1}$$
(with Z on the middle P)

wherein $p$, Ar and Y are as defined above, and at least one of the Z's is a cycloaliphatic or aliphatic group, the aliphatic and cycloaliphatic groups being present in sufficient number to impart an enhanced stabilizing effectiveness for polyvinyl chloride and polyolefin resins to the phosphite, and $n$ and $p_1$ represent the number of such bracketed repeating units in each chain, and can range from zero to an indefinite upper limit, depending upon the molecular weight of the polymer. Inasmuch as compatibility with the synthetic resin may decrease at very high values of $n$, when the polymers tend to become resinous in nature, usually $n$ does not exceed ten, and preferably does not exceed five.

Z can be monovalent or polyvalent, inasmuch as Z can be a plurality of radicals taken separately to satisfy the valences of the phosphite oxygen atoms to which Z is attached. Furthermore, Z can be a bivalent radical forming a heterocyclic ring with the oxygen atoms, or when present in the repeating unit can form a cross-link to adjacent polyphosphite chains of like type. Thus, Z when bivalent can be an aliphatic bivalent group, an aromatic bivalent group, a cycloaliphatic bivalent group and a heterocyclic bivalent group. Z when monovalent can include an aliphatic, cycloaliphatic, aromatic or heterocyclic group, as well as one hydrogen atom. Thus, the invention encompasses acid phosphites as well as neutral triphosphites.

It will be apparent that when $p$ is one and the Z radicals present in the repeating unit of the polymeric phosphite are monovalent, the polyphosphites of the invention exist as linear chains, and when the Z radicals in the repeating units are bivalent cross-links, the polyphosphites take the form of cross-linked polymers.

The polyphosphites which exist as cross-linked polymers wherein the Z of the repeating unit is a cross-link to an adjacent chain can take a variety of forms, only some of which because of space limitations can be represented here. The following formulae are exemplary of cross-linked polymers:

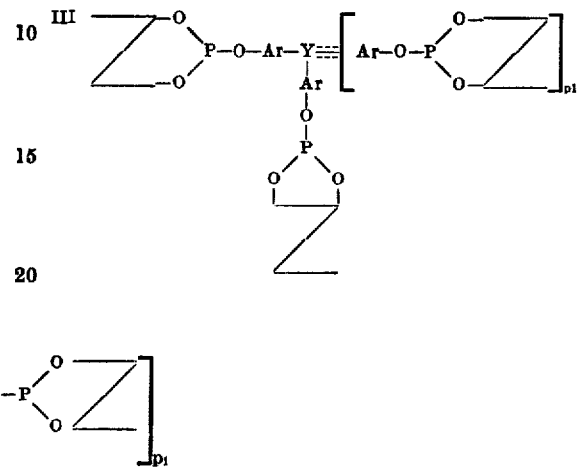

In all of the above formulae, the Z groups will normally have a total of from one to about thirty carbon atoms, and preferably from about two to ten carbon atoms. Z groups when bivalent will usually have at least two carbon atoms where they form a heterocyclic ring with two oxygen atoms of a phosphite group, $n$ and $p_1$ are numbers greater than zero and preferably from one to three.

The Ar group can be any aromatic nucleus, monocarbocyclic or polycarbocyclic, with condensed or separate rings, and the rings when separate can also be connected by a bivalent linking nucleus of the type of Y, for example, Ar—Y—Ar—Y—Ar. Where Ar contains free phenolic hydroxyl groups the polycyclic aromatic group can be represented as follows:

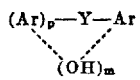

wherein m is an integer from one to five and the free OH groups can be attached to one or more of the Ar groups. The aromatic nucleus Ar, can, in addition to phenolic hydroxyl groups, include one or more inert substituents. Examples of such inert substituents include halogen atoms, e.g. chlorine, bromine and fluorine; hydrocarbon groups (such as alkyl, or cycloalkyl groups) having from one to thirty carbon atoms; oxy- or thio-hydrocarbon groups having from one to about thirty carbon atoms, carbonyl (C=O) and carboxyl

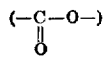

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

In the compounds of the invention, there is one phenolic hydroxyl group or residue thereof for each aromatic ring, but there can be up to five hydroxyl groups per ring.

The simplest form of Ar—Y—Ar group has the structure:

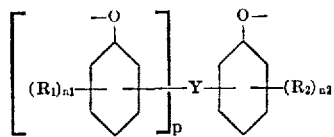

$R_1$ and $R_2$ represent hydroxyl groups or the inert substituents set forth above, p is as defined above and $n_1$ and $n_2$ represent the number of R groups on each ring, and have a value from zero to four.

Exemplary Y groups are alkylene, alkylidene, alkenylene, arylkylene, aralkylidene, cycloalkylene and cycloalkylidene, and oxy-, and thio-substituted such groups, carbonyl, tetrahydrofuranes, esters and triazino groups. The Y groups are usually bi-, tri-, or tetravalent, connecting two, three or four Ar groups. However, higher valence Y groups, connecting more than four Ar groups, can also be used.

Examples of Y are: —$CH_2$—; —$CH_2CH_2$—;

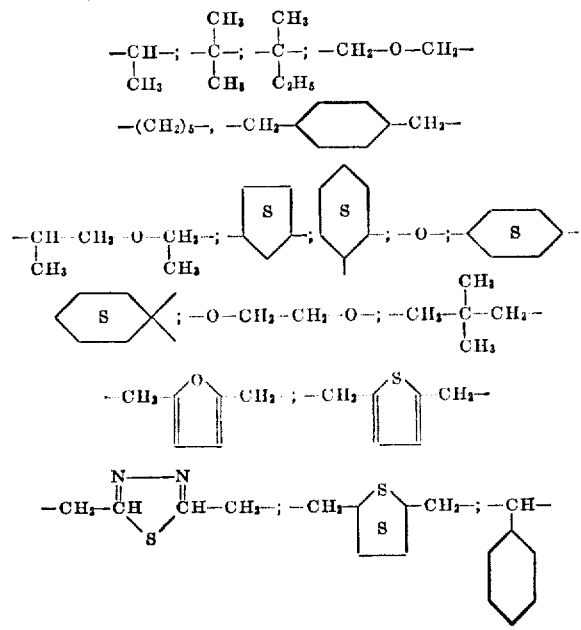

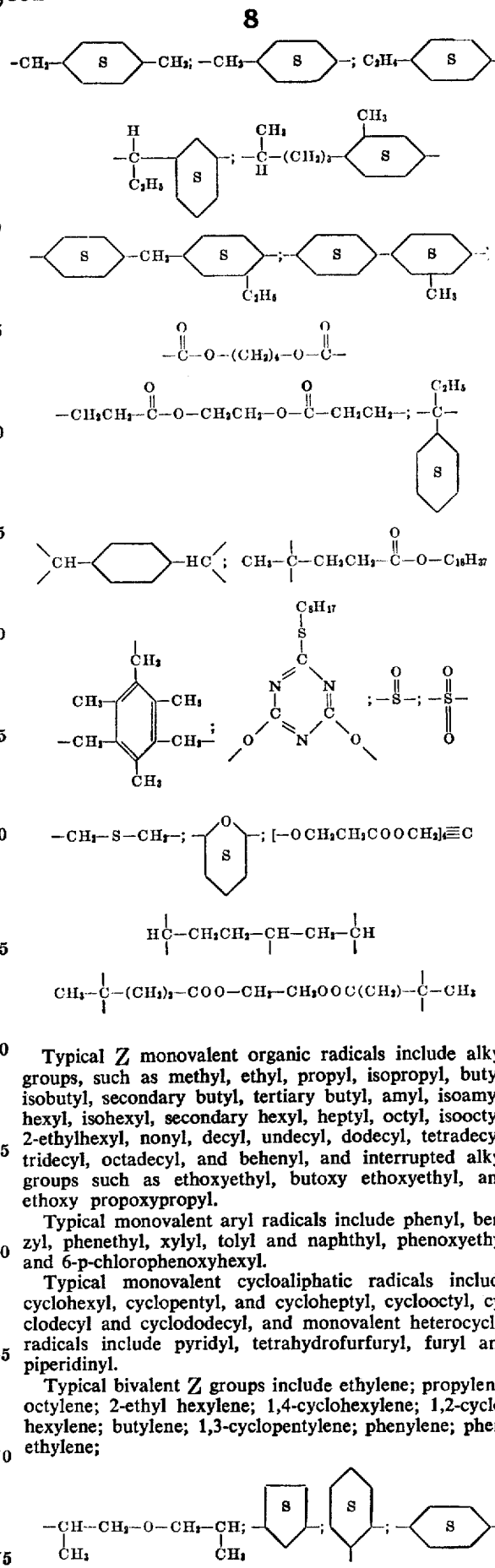

Typical Z monovalent organic radicals include alkyl groups, such as methyl, ethyl, propyl, isopropyl, butyl, isobutyl, secondary butyl, tertiary butyl, amyl, isoamyl, hexyl, isohexyl, secondary hexyl, heptyl, octyl, isooctyl, 2-ethylhexyl, nonyl, decyl, undecyl, dodecyl, tetradecyl, tridecyl, octadecyl, and behenyl, and interrupted alkyl groups such as ethoxyethyl, butoxy ethoxyethyl, and ethoxy propoxypropyl.

Typical monovalent aryl radicals include phenyl, benzyl, phenethyl, xylyl, tolyl and naphthyl, phenoxyethyl and 6-p-chlorophenoxyhexyl.

Typical monovalent cycloaliphatic radicals include cyclohexyl, cyclopentyl, and cycloheptyl, cyclooctyl, cyclodecyl and cyclododecyl, and monovalent heterocyclic radicals include pyridyl, tetrahydrofurfuryl, furyl and piperidinyl.

Typical bivalent Z groups include ethylene; propylene; octylene; 2-ethyl hexylene; 1,4-cyclohexylene; 1,2-cyclohexylene; butylene; 1,3-cyclopentylene; phenylene; phenethylene;

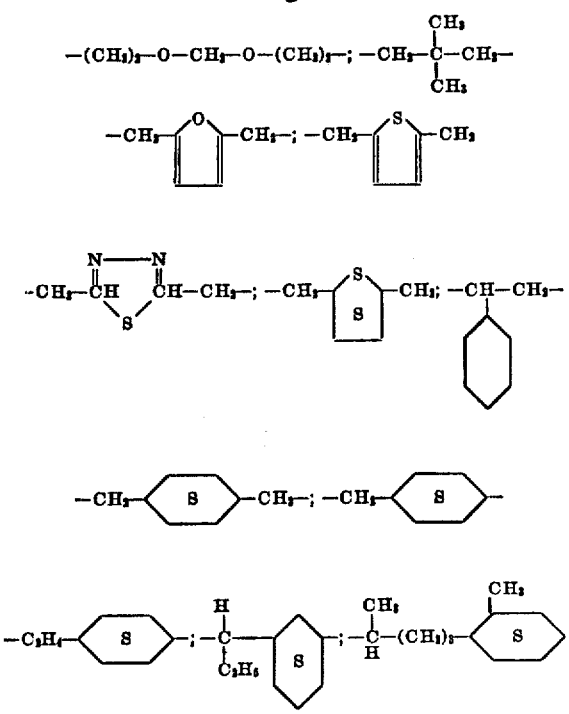
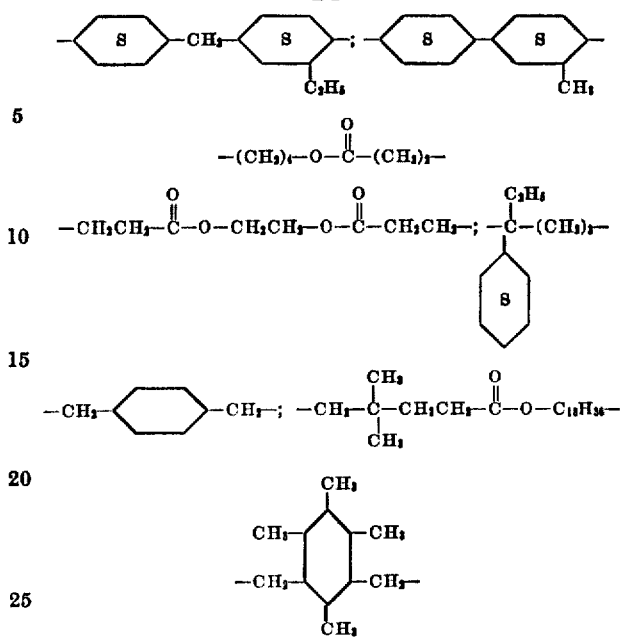
The following compounds are illustrative of phosphites falling within the invention:
1.
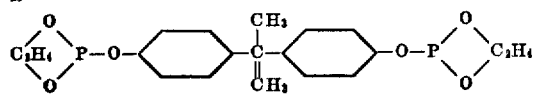
2.
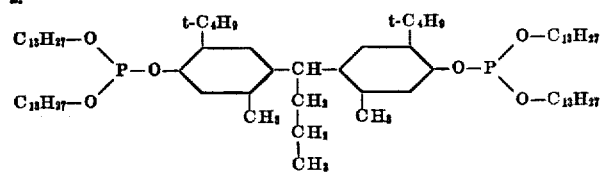
3.
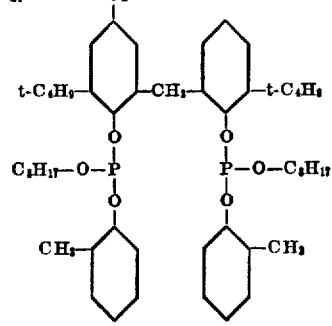
4.
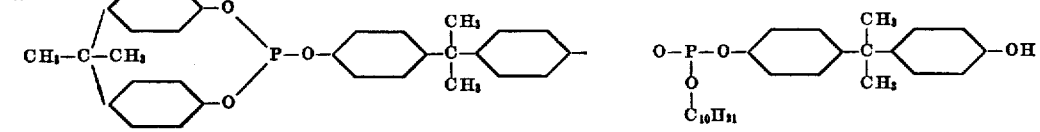
5.
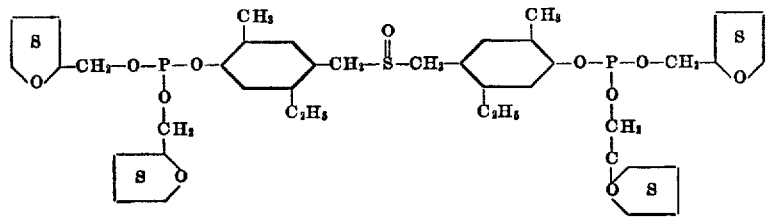

6. 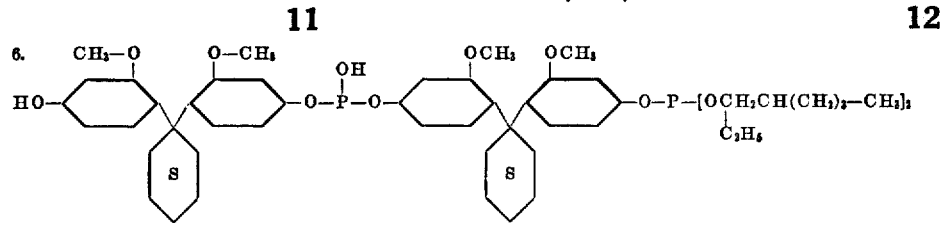
7. 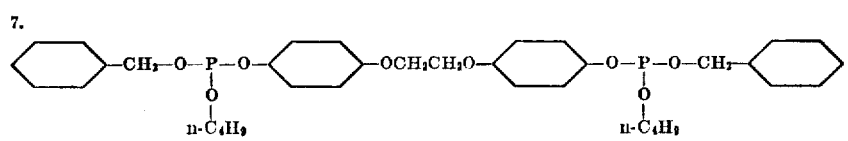
8. 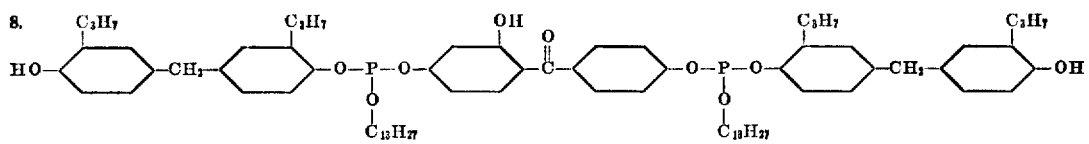
9. 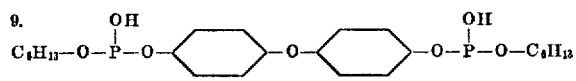
10. 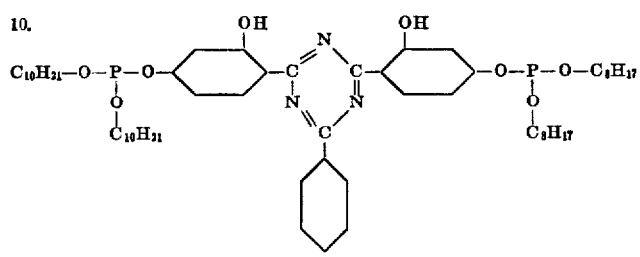
11. 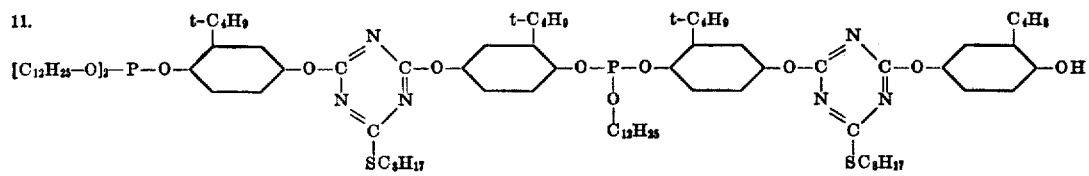
12. 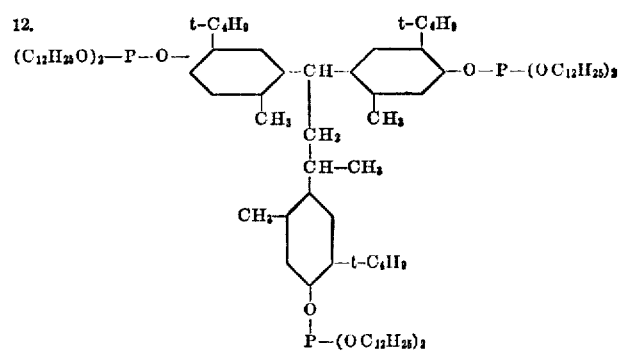
13. 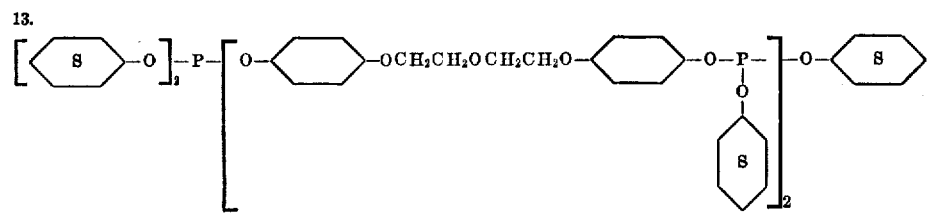
14. 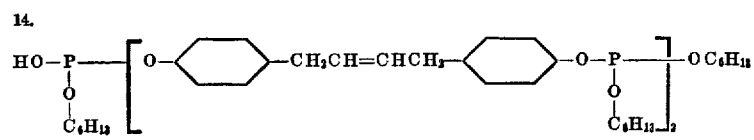

15.
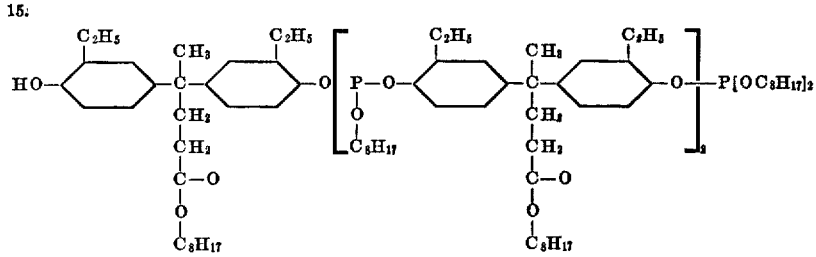
16.
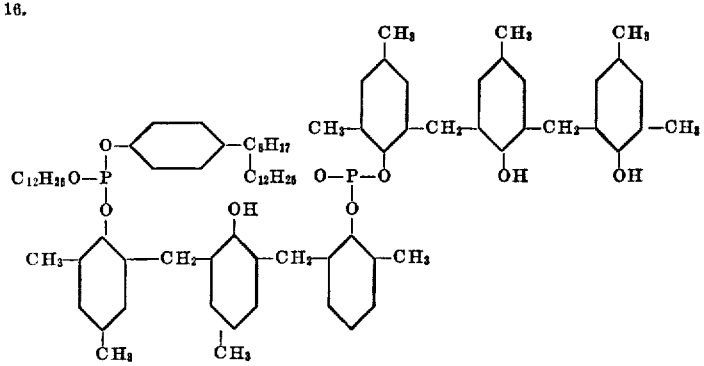
17.
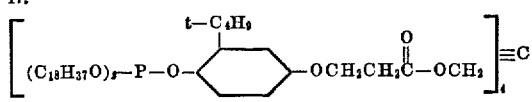
18.
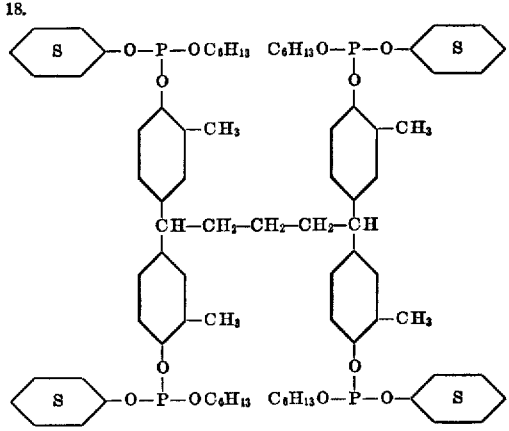
9.
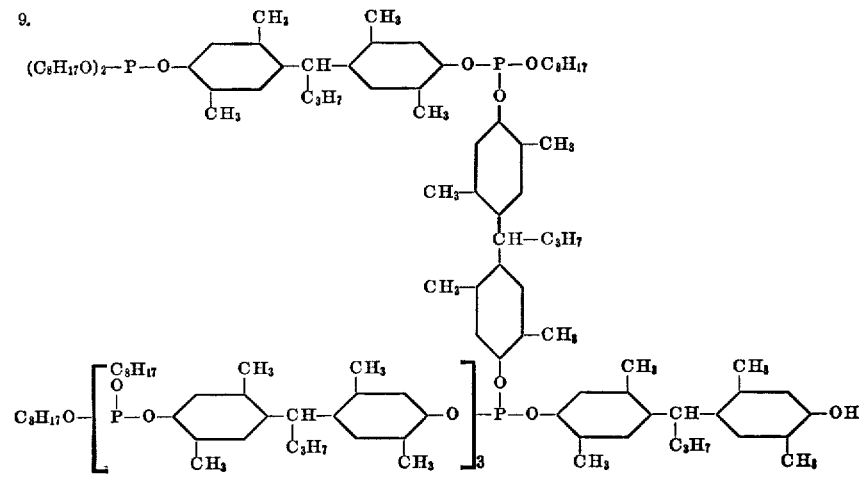

20.
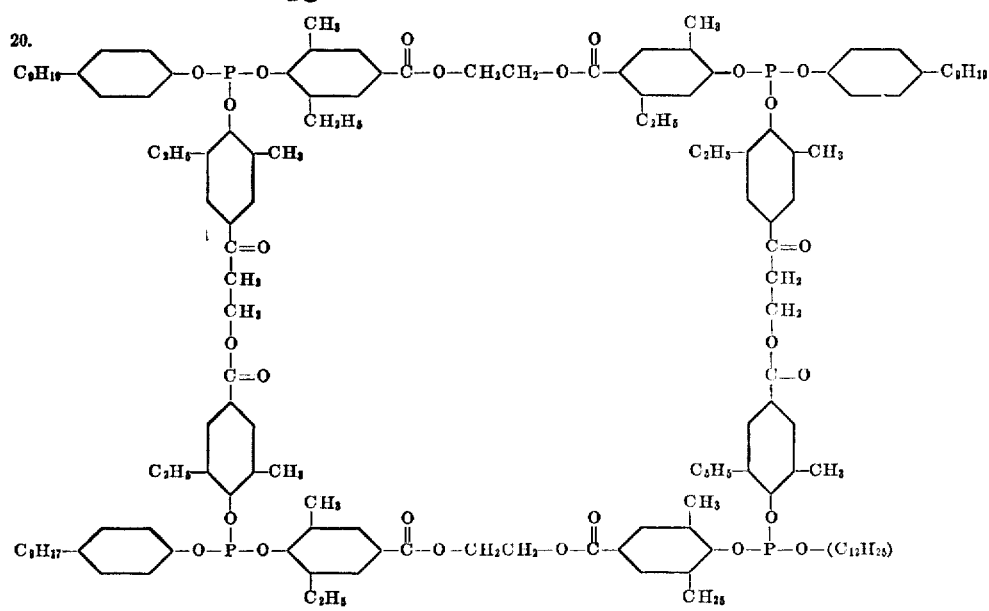
21.
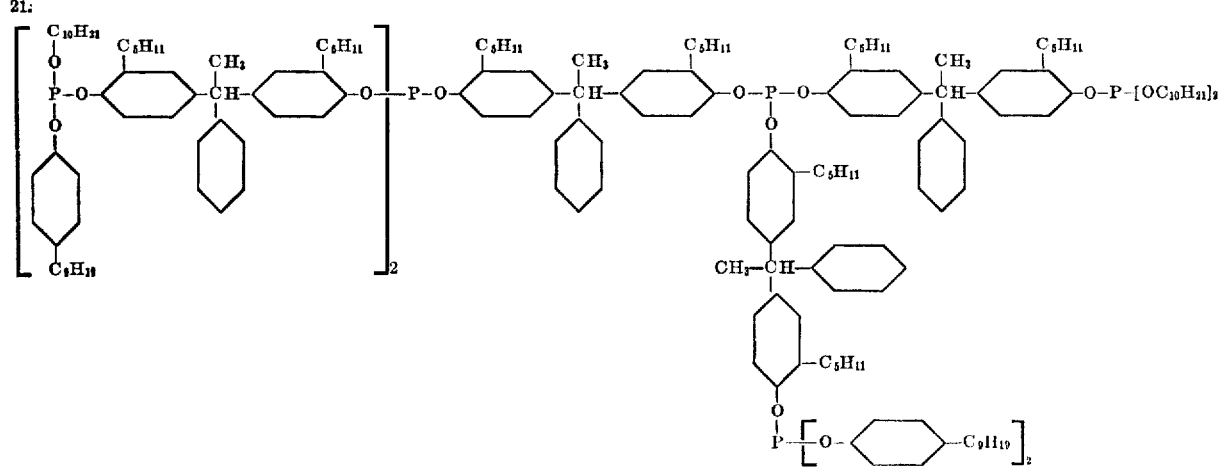
22.
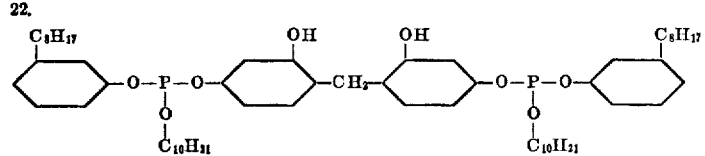
23.
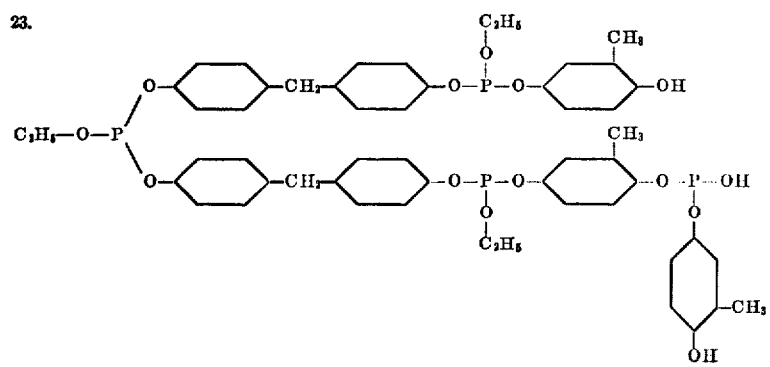

24.
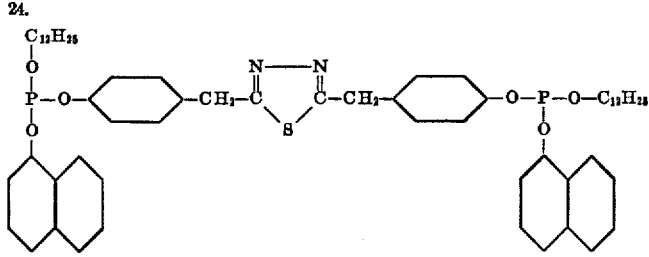

25.
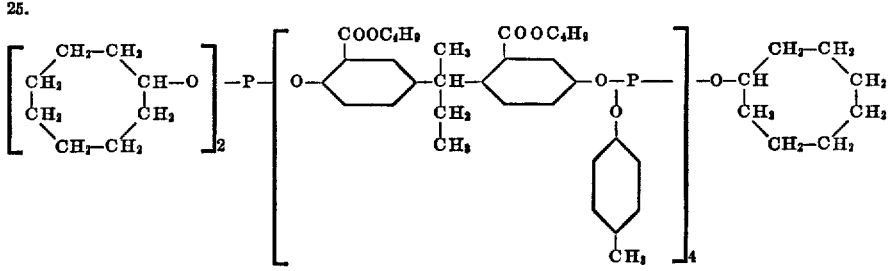

26.
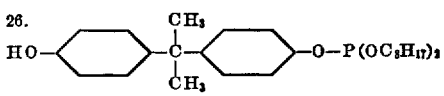

27.
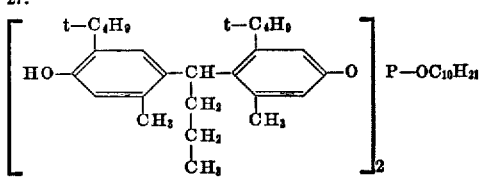

28.
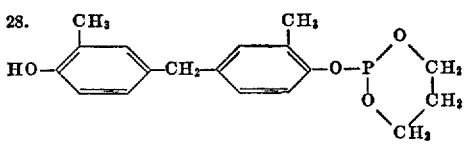

29.
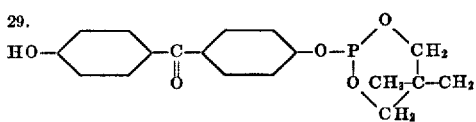

30.
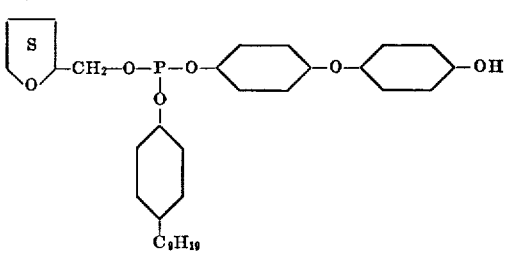

31.
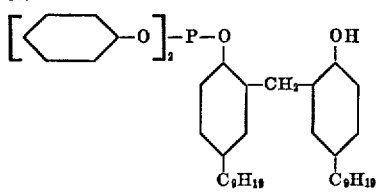

32.
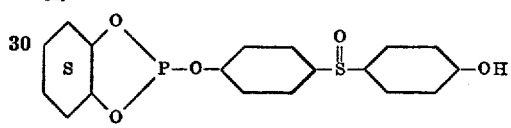

33.
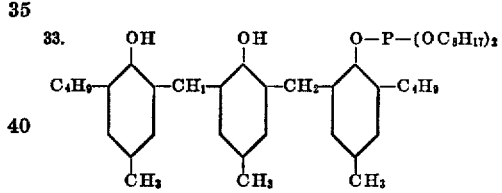

The phosphite esters of the invention can be obtained by the classical method of reacting the desired polyphenols and alcohols with $PCl_3$ in the presence of basic HCl acceptors such as tertiary amines, or alternatively, by first reacting the polyphenols with $PCl_3$ without basic catalyst to form the aryl chlorophosphites and then reacting the aryl chlorophosphites with alcohol in the presence of tertiary amines.

The phosphite ester compounds of the invention are also obtained quite readily by transesterifying an aliphatic and/or cycloaliphatic phosphite having the desired aliphatic and/or cycloaliphatic groups with a polycyclic polyhydric phenol, or alternatively, by transesterifying an aryl phosphite with a polycyclic polyhydric phenol and an aliphatic and/or cycloaliphatic alcohol. One can also transesterify a mixture of phenolic phosphites and aliphatic and/or cycloaliphatic phosphites to obtain a final product with the desired proportion of aliphatic and/or cycloaliphatic radicals in the molecule.

The transesterification reaction proceeds with the replacement of some or all of the substituent radicals of the phosphite by the polycyclic polyhydric phenol and aliphatic and/or cycloaliphatic alcohol present. The extent of the transesterification is determined by the proportion of phenol and/or alcohol equivalents to phosphite equivalents in the reaction mixture. Any other Z groups which can be present in the product of this invention, e.g., heterocyclic groups, and hydrogen atoms, can be present in the phosphite reactant, or added during the transesterification, e.g., heterocyclic alcohol such as tetrahydrofurfuryl alcohol, pyridinemethanol and 2-pyridinol.

An alternative method is to prepare the products of this invention from phosphorus trichloride. PCl₃ is first reacted with a polycyclic polyhydric phenol, alone or mixed with another phenol, and then the aromatic phosphite is transesterified with the desired proportion of an aliphatic and/ or cycloaliphatic alcohol. The other Z groups can also be added in this manner when desired.

The molar proportions of the phosphite and polyhydric polycyclic phenolic groups in the compounds of this invention depend upon the proportions of these ingredients used as starting materials. The structure of the phosphite will depend upon the manner in which such proportions of polyhydric phenol and phosphite can associate in the molecule, and if a variety of structures is theoretically possible, one or several or all of such possibilities can be obtained in admixture in the final products, depending to some degrees upon the preparatory procedure. The more complex the possibilities, the more difficult it will be to elucidate the composition of the final product. However, the examples given above serve as an indication of the types of product obtainable at typical molar ratios of phosphite and phenol.

Proof of structure of these phosphites is at best a difficult problem. A preferred technique of characterization utilizes the oxidation of the phosphite to the phosphate, for example by the quantitative reaction with hydrogen peroxide, as described in U.S. 3,056,824, or with peracetic acid. The phosphates so obtained are stable products well suited to analytical methods such as vapor phase, thin layer and paper chromatography.

It is preferred in most cases to direct the reaction towards formation of a monomer, dimer or linear polymer rather than a cross-linked polymer. The latter polymers are formed under high temperatures and long reaction times from linear polymers containing free hydroxyl groups at intermediate points in the chain. Accordingly, the reaction should be arrested at the linear stage.

One method for ensuring monomer or linear polymer formation is by introducing a monovalent chain-stopper into the system. For example, by using an alkyl aryl phosphite as the starting phosphite, of which the aryl groups are more easily replaceable by the polycyclic phenol, in transesterification reactions, or by adding a monohydric alcohol with the polycyclic phenol when using triaryl phosphite as the starting phosphite, cross-linking will be kept to a minimum. Control of the phosphite-phenol ratio can also serve to prevent such polymer formation.

The transesterification reaction will proceed in the absence of a catalyst, but a faster and more complete reaction is obtained if a catalyst is used. The catalyst employed ordinarily for transesterification is an alkali or alkaline earth metal, which can be added in the form of the metal or in the form of an alkaline compound, such as an alkaline oxide or hydroxide, or alkaline salt, such as the carbonate or hydride, or as the alcoholate. Sodium is quite satisfactory, and so are sodium hydroxide, lithium carbonate, sodium carbonate, potassium carbonate, lithium hydroxide, potassium hydroxide, sodium hydride, lithium hydride, potassium hydride, calcium hydride, the oxides and hydroxides of calcium, strontium and barium, and the alcoholates, usually of methyl, ethyl or isopropyl alcohol, or phenolates of all of these metals. Only a very small amount of the catalyst need be employed, for example, as little as from 0.01 to 2% by weight of the phosphite. Other catalysts which are especially useful for the reaction between aromatic phosphites and cycloaliphatic or aliphatic alcohols include strongly basic tertiary amines, e.g., triethylamine, tributylamine, pyridine, etc.

Alternative catalysts include certain acidic materials such as dihydrocarbon or dihaloaryl phosphites. Examples of such compounds are diphenyl phosphite, didecyl phosphite, dimethyl phosphite, dioctadecyl phosphite, di-p-tolyl phosphite, di-o-tolyl phosphite, di-m-tolyl phosphite, di-2,4-dimethylphenyl phosphite, di-p-butylphenyl phosphite, dinaphthyl phosphite, di-p-chlorophenyl phosphite, di-o-bromophenyl phosphite, dineodecyl phosphite, and dineopentyl phosphite.

It is usually desirable that the reactants be anhydrous, although very small amounts of water can be tolerated in the system. If sodium or potassium or the oxides of calcium, barium, and strontium are added, they will react with the water or alcohol present to form the corresponding hydroxide or alcoholates, and the latter compound will then serve as a catalyst. A volatile alcohol, such as ethanol, methanol or isopropyl alcohol, can be added as a solvent, if the reactants are incompatible.

The reactants, i.e., polycyclic polyhydric phenol, any polyhydric alcohol, monohydric alcohol or phenol, the phosphite, and the catalyst, are mixed, and the reaction mixture then heated at an elevated temperature, usually under reflux. A temperature within the range from about 20° to about 150° C. can be employed. The alcohol or phenol corresponding to the alkyl or aryl group of the phosphite being substituted by the polycyclic phenol or the alcohol is liberated in the course of the reaction and, in order to drive the reaction to completion, it is usually desirable to continuously distill off the liberated alcohol or phenol. The reaction can be carried out for several hours time, and the alcohol or phenol then distilled out, in order to drive the reaction to completion. Vacuum distillation can be used if the phenol or alcohol has a high boiling point.

Exemplary polycyclic phenols used in preparing phosphites of the invention are 4,4'-methylenebis-(2-tertiary-butyl-6-methyl-phenol),
2,2'-bis(4-hydroxyphenyl) propane,
methylenebis-(p-cresol),
4,4'-oxobisphenol,
4,4'-oxobis(3-methyl-6-isopropyl-phenol),
4,4'-oxobis(3-methyl-phenol),
2,.2'-oxobis(4-dodecyl-phenol),
2,2'-oxobis(4-methyl-6-tertiary-butyl-phenol),
4,4'-n-butylidenebis-(2-t-butyl-5-methyl-phenol),
2,2'-methylene-bis-[4-methyl-6(1'-methyl-cyclohexyl)-phenol],
4,4'-cyclohexylidenebis-(2-tertiary-butyl-phenol),
2,6-bis-(2'-hydroxy3'-t-butyl-5'-methyl-benzyl)-4-methyl-phenol,
4,4'-oxobis(naphthalene-1,5-diol),
1,2'-methylenebis(naphthalene-1,8-diol),
1,3'-bis(naphthalene-2,5-diol)propane,
and 2,2'-butylidenebis(naphthalene-2,7-diol),
di(hydroxyphenyl)ketone,
(3-methyl-5-tert-butyl-4-hydroxyphenyl)-(4'-hydroxyphenyl) methane,
2,2'-methylenebis(4-methyl-6-isopropylphenol),
2,2'-methylenebis(6-tert-butyl-4-chlorophenol),
(3,5-di-tert-butyl-4-hydroxyphenyl)-(4'-hydroxyphenyl)methane,
(2-hydroxyphenyl)-(3',5'-di-tert-butyl-4'-hydroxyphenyl)methane,
2,2'-ethylidenebis(4-octylphenol),
4,4'-isopropylidenebis(2-tert-butyl-phenol),
2,2'-isobutylidenebis-(4-nonylphenol),
2,4-bis(4-hydroxy-3-t-butylphenoxy)-6-(n-octylthio)-1,3,5-triazine,
2,4,6-tris(4-hydroxy-3-t-butylphenoxy)-1,3,5-triazine,
2,2'-bis-(3-t-butyl-4-hydroxyphenyl)thiazolo-(5,4-d) thiazole,
2,2'-bis(3-methyl-5-t-butyl-4-hydroxyphenyl)-thiazolo-(5,4-d)-thiazole,
4,4'-bis(4-hydroxyphenyl)pentanoic acid octadecyl ester,
cyclopentylidene 4,4'-bisphenol,
2-ethylbutylidene 4,4'-bisphenol,
4,4'-cyclooctylidenebis(2-cyclohexylphenol),
β,β-thiodiethanolbis(3-tert-butyl-4-hydroxyphenoxy acetate),
1,4-butanediolbis(3-tert-butyl-4-hydroxyphenoxy acetate),
pentaerythritoltetra(4-hydroxyphenyl propionate),
2,4,4'-trihydroxy benzophenone, bis(2-tert-butyl-4-hydroxy-5-methylphenyl)sulfide,
bis(2-tert-butyl-4-hydroxy-5-methylphenyl)sulfoxide,
bis(3-methyl-5-tert-butyl-4-hydroxy benzyl)sulfide,
bis(2-hydroxy-4-methyl-6-tert-butyl phenyl)sulfide,
4,4'-bis(4-hydroxyphenyl)pentanoic acid octadecyl thiopropionate ester,
1,1,3-tris(2'-methyl-4'-hydroxy-5'-tert-butylphenyl)butane,
1,8-bis(2-hydroxy-5-methylbenzoyl-)n-octane,
2,2'-methylenebis[4'-(3-tert-butyl-4-hydroxyphenyl)-thiazole],
1-methyl-3(3-methyl-5-tert-butyl-4-hydroxybenzyl)-naphthalene,
2,2'-(2-butene)bis-(4-methoxy-6-tert-butyl phenol).

The following examples are illustrative of the preparatory procedure for the compounds of this invention:

EXAMPLE 1

55 g. of 4,4'-n-butylidene-bis(2-tertiary-butyl-5-methyl phenol), 30 g. of triisooctyl phosphite and 0.48 g. of sodium hydroxide were heated at 120 to 125° C. for three hours, forming a clear brown homogeneous liquid. This was then heated at 140° C. under reduced pressure, and the isooctanol which was distilled off was recovered. The weight of isooctanol recovered showed that the reaction product was di-(4,4' - n-butylidene-bis(2-tertiary-butyl-5-methyl-phenol)) isooctyl phosphite.

EXAMPLE 2

100 g. of 4,4'-benzylidene-bis(2-tertiary-butyl-5-methyl-phenol), 76 g. of cyclohexyl diphenyl phosphite and 0.48 g. of sodium hydroxide were heated at 120 to 125° C. for three hours, forming a clear brown solution. This was then heated at 140° C. under reduced pressure, and the phenol which was distilled off was recovered. The weight of phenol recovered showed that the reaction product was (4,4' - benzylidene-bis (2 - tertiary-butyl-5-methyl-phenol)) cyclohexyl phenyl phosphite.

EXAMPLE 3

One mole of triphenyl phosphite (310 grams), 0.65 mole of 2,2' - bis(-parahydroxyphenyl)propane (148 grams) and 1.8 mole isooctanol (234 grams) were heated at 110 to 120° C. for three hours, together with 0.5 gram of sodium hydroxide. The reaction mixture was then vacuum stripped at 170° C. at the water pump to remove as much phenol as possible. 273 grams of phenol, 96% of the calculated quantity, was obtained, showing that the reaction product was isooctyl 4,4'-bis (-parahydroxyphenyl)propane phosphite.

EXAMPLE 4

One mole of triphenyl phosphite, 1.0 mole of 4,4'-n-butylidenebis(2 - tertiary-butyl-5-methylphenol), and 2 moles of tridecyl alcohol were reacted in two stages. The triphenyl phosphite was first transesterified with the dihydricphenol in the presence of 0.5 gram of sodium hydroxide, reacting the ingredients at 110 to 120° C. for three hours, and vacuum-stripping the mixture to 170° C. on the water pump. Next, the tridecyl alcohol was added, and the mixture again heated to 110 to 120° C. for three hours, and then vacuum stripped to 170° C. at the water pump. The combined strippings gave 89% of the calculated quantity of phenol at the first stage, and 98% at the second stage. The reaction product was tridecyl 4,4'-n-butylidene-bis(-2-tertiary butyl-5-methyl-phenol) phosphite.

EXAMPLE 5

1.1 mole of isooctyl diphenylphosphite and 0.4 mole of 4,4'-oxobis phenol were heated together in the presence of 0.5 gram of sodium hydroxide at 110 to 120° C. for three hours. The reaction mixture was then vacuum stripped to 170° C. at the water pump, obtaining 53½% of the calculated quantity of phenol. The reaction product was isooctyl phenyl 4,4'-oxobis phenol phosphite.

EXAMPLE 6

1.1 moles of triphenyl phosphite, 1.55 moles of 2-ethyl-hexanol and 0.33 mole of 2,2'-methylene-bis[-4-methyl-6-(1'-methylcycloxy) phenyl] were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2' - methylenebis[ - 4 - methyl-6-1'(-methylcyclohexyl) phenol] was added, and the reaction mixture again heated at 110 to 120° C. for three hours, and vacuum stripped to 170° C. at the water pump. 83% of the calculated phenol was recovered. The reaction product was 2-ethylhexyl-2,2'methylene-bis[4-methyl-6-(1'-methylcyclohexyl) phenol] phosphite.

EXAMPLE 7

2 moles of 2,2'-bis-(parahydroxy phenyl)propane and 1 mole of decyl diphenyl phosphite were heated at 110 to 120° C. for three hours, together with 0.5 gram of sodium hydroxide. The reaction mixture was vacuum stripped to 170° C. with a water pump to remove as much phenol as possible, 98% of the calculated quantity of phenol was recovered, showing that the reaction product was di(2,2'-bis-(parahydroxy phenyl)) propane decyl phosphite.

EXAMPLE 8

0.2 mole of octyl diphenyl phosphite was reacted with 0.105 mole of 4,4'-methylene-bis(2-t-butyl-6-methyl phenol) and heated in the presence of 0.5 gram of sodium hydroxide at 110° C. to 120° C. for three hours. The reaction mixture was then vacuum stripped with a water pump to 170° C. until 65% octylphenol was collected.

EXAMPLE 9

One mole of triphenyl phosphite, 0.5 mole of 4,4'-n-butylidenebis (2-tertiary-butyl-5-methylphenol) and two moles of tridecyl alcohol were reacted in two stages. The triphenyl phosphite was first transesterified with the bisphenol in the presence of 0.5 gram of sodium hydroxide, reacting the ingredients at 110 to 120° C. for three hours, and vacuum stripping the mixture to 170° C. on the water pump. Next, the tridecyl alcohol was added, and the mixture again heated to 110 to 120° C. for three hours, and then vacuum stripped to 170° C. at the water pump. The combined distillate gave 89% of the calculated quantity of phenol at the first stage, and 98% at the second stage. The reaction product was tetra-tridecyl (4,4' n-butylidene-bis (2-tertiary-butyl - 5 - methyl-phenyl)) diphosphite. $D_{25}=0.931$, $n_D^{25}=1.4910$, 4.48% trivalent phosphorus (analyzed according to the method set forth in Patent No. 3,056,824).

EXAMPLE 10

1.1 moles of triisooctyl phosphate and 0.4 mole of 4,4'-methylenebis(-2-tertiary butyl-5-methyl-phenol) were heated together in the presence of 0.5 gram of sodium hydroxide at 110 to 120° C. for three hours. The reaction mixture was then vacuum stripped to 170° C. at the water pump, obtaining 93% of the calculated quantity of isooctanol. The reaction product was then distilled in a wiped-film molecular still and separated into a more volatile fraction consisting mostly of tri-isooctyl phosphite, and a less volatile fraction consisting mostly of tetra-isooctyl-4,4'-methylenebis-(2-t-butyl-5-methylphenyl) di-phosphite.

EXAMPLE 11

1.1 moles of triphenyl phosphite, 0.85 mole of 2-ethylhexanol and 1.1 mole of 2,2'-methylene bis-(-4-methyl-6-1'-methyl cyclohexyl phenol) were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2'-methylene bis-(-4-methyl-6-1'-methylcyclohexyl phenol) was added, and the reaction mixture again heated at 110 to 120° C. for three hours, and vacuum stripped to 170° C. at the water pump. 83% of the calculated phenol was recovered. The reaction product was 2-ethylhexyl 2,2'-methylene-bis (4-methyl-6-1'-methylcyclohexyl phenyl) polyphosphite, having a molecular weight of 1600±160 (ebullisoscopic in benzene).

EXAMPLE 12

0.5 mole of triphenyl phosphite, 0.16 mole of 2-ethylhexanol and 0.5 mole of 2,2'-methylene bis-(-4-methyl-6-(1'-methyl cyclohexyl) phenol) were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2'-methylene bis-(4-methyl-6-(1'-methyl cyclohexyl) phenol) was added, and the reaction mixture again heated at 110 to 120° C. for three hours, and vacuum stripped to 170° C. at the water pump. 83% of the calculated phenol was recovered. The reaction product was phenyl, 2-ethylhexyl, 2,2'-methylene-bis (4-methyl-6-1'-methylcyclohexyl phenyl) polyphosphite, containing one 2-ethylhexyl group for every three phosphite groups and having a molecular weight of 1600±160 (ebullioscopic in benzene).

EXAMPLE 13

Triphenyl phosphite (103 g., 0.33 mole) was transesterified with isooctanol (2 hours at 110–120°) and with 4,4' - isopropylidenebisphenol (3 hours at 120–140°), various proportions of reagents being used, as noted in Table A below. At the end of the reaction, the mixtures of isooctyl 4,4'-isopropylidenebisphenyl polyphosphites were vacuum-distilled to 150° to remove phenol and isooctanol (if any). All reaction products were liquid. Proportions and properties are given in Table A.

TABLE A

| Composition | Weight (grams) | | | |
|---|---|---|---|---|
|  | A | B | C | D |
| Triphenyl phosphite | 103 | 103 | 103 | 103 |
| Isooctanol | 56 | 65 | 73 | 78 |
| 4,4'-isopropylidenebisphenol | 64.5 | 57 | 53 | 45.5 |
| Sodium | 0.1 | 0.1 | 0.1 | 0.1 |
| Product: |  |  |  |  |
| Phenol distilled | 87 | 86 | 87 | 88 |
| Isooctanol distilled | None | None | 1.2 | 3.4 |
| Density 25° C | 1.027 | 1.038 | 1.023 | 1.011 |
| $n_D^{25}$ | 1.5445 | 1.5331 | 1.5233 | 1.5133 |

EXAMPLE 14

Hexa-tridecyl butane - 1,1,3 - tris (2'-methyl-5'-t-butylphenyl-4'-) triphosphite was prepared from 91.7 g. (0.167 mole) 1,1,3-tris (2'-methyl-4'-hydroxy-5'-t-butlyphenyl) butane, 155 g. (0.5 mole) triphenyl phosphite, 200 g. (1 mole) tridecyl alcohol (a commercial mixture of branched-chain, primary thirteen carbon alcohols), and 1 g. anhydrous potassium carbonate. The triphenyl phosphite was transesterified with the trihydric phenol, vacuum stripped, the alcohol added, and the mixture heated and stripped again. The stripping gave 89% of the calculated quantity of phenol at the first stage and 98% at the second stage. The product analyzed 4.35% trivalent phosphorus, $D_{25}=0.940$, $n_D^{25}=1.4945$.

EXAMPLE 15

2,6-bis (2' - hydroxy-3',5-dinonylbenzyl-4-nonyl-phenol was prepared from 5 moles nonyl phenol, 10 moles dinonylphenol, 10 moles paraformaldehyde, and 8.3 g. 0.17% oxalic acid catalyst. The reactants and catalysts were dissolved in toluene and refluxed for 24 hours. The catalyst was neutralized with sodium carbonate, the toluene removed, and the trisphenol so obtained used directly in the preparation of the phosphite.

One mole (936 g.) of the trisphenol, 1.1 mole isooctyl diphenyl phosphite, and 1.2 g. sodium hydroxide were heated 3 hours at 110–120° C. and stripped to 150° C. Phenol was stripped amounting to 93% of the calculated quantity. The product was isooctyl-[2,6-bis(2'-hydroxy-3',5-dinonylbenzyl) - 4 - nonylphenyl] polyphosphite, $D_{25}=0.961$, $n_D^{25}=1.4952$.

EXAMPLE 16

Tetratridecyl 4,4'-isopropylidenebisphenyl diphosphite, $D_{25}=0.953$, $n_D^{25}=1.4853$, was prepared from 0.5 mole 4,4'-isopropylidene bis(phenol) 1 mole triphenyl phosphite, 2 moles tridecyl alcohol, and sodium metal as catalyst in a single transesterification step. Phenol stripped was 89% of the calculated quantity.

EXAMPLE 17

Tetratridecyl-4,4'-oxydiphenyl diphosphite, $D_{25}=0.932$, $n_D^{25}=1.4830$, was similarly prepared from 62 g. triphenyl phosphite, 20.4 g. 4,4'-oxybisphenol, and 80 grams tridecyl alcohol. Phenol stripped was 88.7% of the theoretical quantity.

EXAMPLE 18

Tetra - n - dodecyl 4,4' - n - butylidenebis(2-t-butyl-5-methylphenyl) diphosphite was similarly prepared from 1550 g. triphenyl phosphite, 950 g. 4,4'-butylidenebis-(2-t-butyl-5-methylphenol), 1860 g. n-dodecanol, and 4 g. sodium hydroxide. Phenol stripped was 90.4% of the calculated quantity and the product analyzed 4.24% trivalent phosphorus.

EXAMPLE 19

Di(4,4'-n-butylidenebis - (2-t-butyl-5-methyl phenol)), tri-n-dodecyl diphosphite, $D_{25}=0.967$, $n_D^{25}=1.4985$, was prepared form 2 moles of triphenyl phosphite, 3 moles of n-dodecyl alcohol, 2 moles of 4,4'-n-butylidenebis (2-t-butyl-5-methyl phenol) and 4 grams sodium hydroxide. The reactants were heated and mixed at 120 to 130° C. for approximately 5 hours and then vacuum stripped to 150° C. to remove phenol.

EXAMPLE 20

Tetrahydrofurfuryl alcohol, 54 grams (0.5 mole) was mixed with 159 grams (0.5 m.) butyldicresyl phosphite and 0.5 grams sodium hydroxide and heated for 3 hours at 110° C. The reaction product was then vacuum distilled under a water pump to 170° C. and the cresol removed was 90% of the calculated quantity. The product was further reacted with 57 grams (0.25 mole) 4,4'-isopropylidene bisphenol for 5 hours at 120° C. The reaction product was vacuum distilled under a water pump to 190° C. The product analyzed 7.6% trivalent phosphorus.

EXAMPLE 21

Butoxyethanol, 59 grams (0.5 mole) was reacted with 100 grams (0.322 mole) triphenyl phosphite at 120° C. for 3 hours, and then vacuum stripped. The product was then reacted with 85 grams (0.2 mole) of 2,2'-methylene-bis-(-4-methyl-6-1'-methylcyclohexyl phenol) for 3 hours at 120° C. The mixture was then stripped under a water pump to 150° C. 91% of the calculated quantity of phenol was recovered and the material was a diphosphite.

EXAMPLE 22

Cyclooctanol 128 grams (1 mole) was transesterified with 234 grams (1 mole) diphenyl phosphite and 90 grams of phenol was distilled off. The product was reacted with 114 grams (0.5 mole) 4,4'-isopropylidene bisphenol and 92% of the calculated quantity of phenol was recovered. The product was isopropylidene bisphenyl dicyclooctyl diacid phosphite.

EXAMPLE 23

100 grams of the tridecyl 4,4'-butylidene bis-(-2-tert-butyl-5-methyl phenyl) phosphite of Example 4 plus 7 grams phosphorous acid were warmed at 80° C. for 1 hour forming the butylidene bis-(-2-tert-butyl-5-methyl phenyl) tridecyl acid phosphite.

EXAMPLES 24 THROUGH 27

Various mixed aliphatic-aromatic polyphosphites were formed by transesterifying tricresyl phosphite and a mixture of tricresyl phosphite and octyl dicresyl phosphite with 4,4'-isopropylidene bisphenol in the proportions set forth in the table below. The transesterification was carried out for 3 hours at 130° C. At the end of the reaction, the reaction mixture was vacuum distilled to 190° C. to remove 90% of the calculated quantity of the cresol formed during the transesterification reaction. All of the reaction products were liquid.

matic ring: oxyhydrocarbon; thiohydrocarbon; heterocyclic; carbonyl; sulfinyl; and sulfonyl groups.

Ar is a phenolic nucleus which can be a phenyl or a polycarbocyclic group having condensed or separate phenyl rings; each Ar group is either connected through an oxygen atom to a phosphite group or contains a free phenolic hydroxyl group or both; p is a number, one or greater, and preferably from one to four.

Preferably Y is other than a thioether sulfide $(-S-)_x$, wherein $x$ is one or more, and there is attached to a phosphite group in the molecule at least one radical selected from the group consisting of aliphatic and cycloaliphatic groups; in this case the phosphites are the same as those described previously.

The remaining groups of the phosphite are selected from the group consisting of hydrogen, monovalent and bivalent aliphatic, cycloaliphatic, aromatic and heterocyclic groups having from one to about thirty carbon

|  | Example | | | | |
|---|---|---|---|---|---|
|  | Control B | 24 | 25 | 26 | 27 |
| Reactants: | | | | | |
| Tricresyl phosphite, moles | 2 | 4 | 3 | 2 | 1 |
| 2-ethylhexyl dicresyl phosphite, moles |  | 1 | 1 | 1 | 1 |
| 4,4'-isopropylidene bisphenol (Bisphenol A), moles | 1 | 4 | 3 | 2 | 1 |
| Product | Dimer | Pentamer | Tetramer | Trimer | Dimer |

EXAMPLES 28 THROUGH 30

0.2 mole of octyl diphenyl phosphite was mixed with 0.105 mole of the bicyclic phenol shown in the table below and heated in the presence of 0.5 gram of sodium hydroxide at 110° C. to 120° C. for 3 hours. The reaction mixture was then vacuum stripped to 170° C. with a water pump, obtaining the percentage of the calculated quantity of phenol set forth in the Table below. The product was a bisphenyl octyl phenyl diphosphite.

| Example | Polycyclic phenol reactant | Percent of (calculated) phenol distilled |
|---|---|---|
| 28 | Oxo-diphenol | 95 |
| 29 | 4,4'-isopropylidene bisphenol | 99.8 |
| 30 | 4,4'-cyclohexylidene bisphenol | 90 |

EXAMPLE 31

Dibutyl monophenyl phosphite (2.2 moles=594 grams), 4,4' - butylidenebis(2 - t - butyl-5-methyl phenol) (1 mole=382 grams) and potassium phenolate catalyst, 5 grams, were heated three hours at 120–130° C. The mixture was then stripped through a wiped-film still, to remove phenol and unreacted dibutyl monophenyl phosphite. The total distillate was 236 grams. The product was

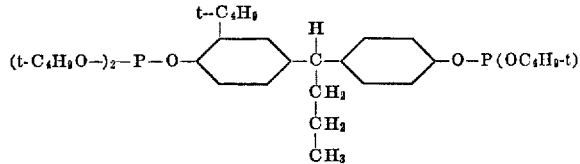

In accordance with the invention, there are also provided synthetic resin compositions having an improved resistance to deterioration containing organic phosphites having attached to each phosphite group at least one polycyclic aromatic group having the formula:

$$(Ar)_p-Y-Ar$$

wherein Y is a polyvalent linking group selected from the group consisting of oxygen; sulfur; aliphatic, cycloaliphatic and aromatic hydrocarbon groups attached to each Ar group through a carbon atom not a member of an aroatoms, all of the groups being attached to phosphorus through oxygen.

The invention is applicable to any halogen-containing resin, such as polyvinyl chloride resin. The term "polyvinyl chloride" as used herein is inclusive of any polymer formed at least in part of the recurring group:

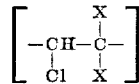

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers, but also after-chlorinated polyvinyl chlorides as a class, for example, those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, or ethylene. The invention also is applicable to mixtures of polyvinyl chloride in a major proportion with a minor proportion of other synthetic resins such as chlorinated polyethylene or a copolymer of acrylonitrile, butadiene and styrene.

The invention is of particular application to the stabilization of rigid polyvinyl chloride resin compositions, that is, resin compositions which are formulated to withstand high processing temperatures, of the order of 375° F. and higher. However, the stabilizer compositions of the invention can be used with plasticized polyvinyl chloride resin compositions of conventional formulation where resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturation acids are acrylic, oleic, linoleic, linolenic, crucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The organic phosphites of the invention can, if desired, be employed in conjunction with other stabilizers for polyvinyl chloride resins, although, in most cases, the stabilization imparted by the organic phosphite will be sufficient, since it is better than a mixture of phosphite and a phenol. In some cases, however, for particular end uses, special stabilization effects may be desired.

As supplemental stabilizers, there can be employed metal salt stabilizers of the type described in the Leistner et al. Pat. Nos. 2,564,646 and 2,716,092 and other patents in this field. The metal salt stabilizer is a salt of a polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulphur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid ($C_{12}H_{25}$—S—$(CH_2)_2$—COOH), hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, methyl furoic acid, and half-esters of dicarboxylic acids with alcohols and polyols, such as monooctyl maleate half-esters. These are used in the form of their metal salts, particularly the alkaline earth metal salts, such as magnesium, barium, strontium and calcium, and the zinc, cadmium, lead and tin salts. Where these salts are not known, they are made by the usual types of reactions, such as by mixing the acid, acid chloride or anhydride with the corresponding oxide or hydroxide of the metal in a liquid solvent, and heating, if necessary, until salt formation is complete. The barium, cadmium and zinc compounds are preferred.

Also effective stabilizers are organic compounds containing at least one epoxy group. These compounds can be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic, and alicyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxypropoxy) benzene, 4,4'-bis (2,3-epoxypropoxy) diphenyl ether, 1,8 - bis(2,3 - epoxypropoxy) octane, 1,4-bis(2,3-epoxypropoxy) cyclohexane, and 1,3-bis(4,5-epoxy pentoxy) 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2'-bis(4-hydroxyphenyl) propane (Bisphenol A), 2,2'-bis(4-hydroxyphenyl) butane, 4,4'-dihydroxy-benzophenone and 1,5-dihydroxy naphthalene with halogen-containing epoxides such as 3-chloro-1,2-epoxybutane, 3-chloro-1,2-epoxyoctane, and epichlorhydrin. Typical epoxy compounds that combine stabilizing with plasticizing action are listed above under plasticizers.

The phosphites of this invention are useful in combination with an organotin moiety and a mercapto acid moiety. Such moieties can be formed together in any combination in a single stable molecule in which molecule such moieties display stabilizing effectiveness for polyvinyl chloride resins.

The organotin moiety can be characterized as an organic group linked to tin by means of carbon in not more than three of the tin valences. The remaining tin valences can be taken by groups linked to tin by sulfur or by oxygen.

Thus, the organotin moiety has the structure:

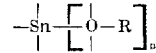

where R is hydrogen or an organic radical and $n$ has a value from 1 to 3.

The mercapto acid moiety has at least one mercapto group SH or residue thereof and at least one carboxylic acid radical COOM, wherein M can be hydrogen, an esterifying radical R or a salt-forming cation. Thus, this moiety has the structure:

in which Z is the remainder of the molecule and $n_1$ and $n_2$ are the number of mercapto residues and carboxylic acid residues, respectively, and will usually be a number from 1 to 10. The free valences of the mercapto group and carboxylic acid group are taken with any type of radical reactive with mercapto and carboxylic acid groups, respectively, such as the tin atom of an organotin moiety, or hydrogen or an alcohol residue or salt-forming cation.

Thus, the mercapto acid moiety can be linked to tin in an organotin compound containing the organotin moiety. It could be present therin as the organotin salt through the carboxy linkage and the mercapto group or through only one or the other of them. The organotin compound can also include mercapto acid groups linked to tin through carbon, and these groups also function as mercapto acid moieties in accordance with the invention.

The organotin compounds useful in this combination can be defined by the formula:

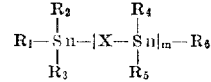

wherein X is oxygen, sulfur or a bivalent linking radical, linked to tin through oxygen, sulfur or carbon, and containing from one to about ten carbon atoms, and the R's are oxide, hydroxide OH (stannonic acid), or organic groups containing from one to about thirty carbon atoms linked to the tin through carbon or oxygen or sulfur, of which at least one and not more than three per tin atom is linked to tin through carbon, and $m$ is an integer ranging from zero to about fifteen. Optionally, one or more organic groups can be mercapto acid groups linked to tin through the sulfur of the mercapto group or the carboxylic acid group or carbon.

The preferred mercapto acids are the saturated dibasic acids, as well as the monohydric and polyhydric alcohol half or mono esters thereof. Included in this preferred group are mono-esters of these acids with, for example, methyl alcohol, ethyl alcohol, lauryl alcohol, cyclohexanol, ethylene glycol, dipropylene glycol and the ethyl ether of ethylene glycol.

The following organotin compounds are typical of those coming within the invention:

1. 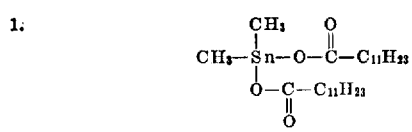

2. 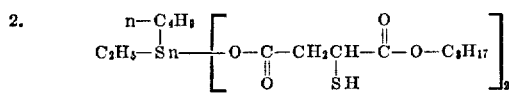

3. 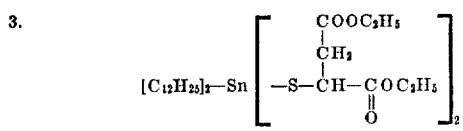

4. [Iso—C₈H₁₇]₂—Sn—[S—C—C₁₁H₂₃]₂
         ‖
         O

5. [Iso—C₄H₉]—Sn [—O—C—CH=CH—C—O—(CH₂)₃—OH]₃
                  ‖              ‖
                  O              O

6. 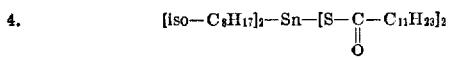

7. n—C₄H₉—Sn[—O—C—CH₂—CH—C—O—(CH₂)₃—OH]₃
              ‖       |   ‖
              O       SH  O 8. n—C₄H₉—Sn—[S—CH₂CH₂—C—O—CH₂CH₂—O—CH₂CH₂OH]₃
                       ‖
                       O

7. 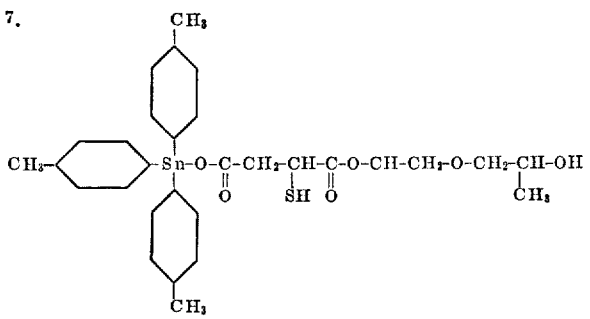

8. 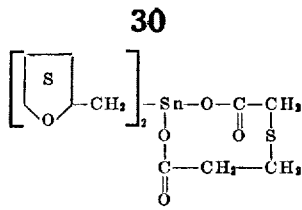

9. 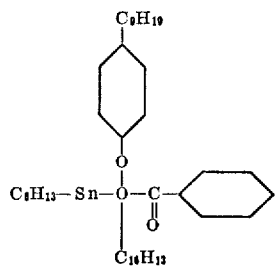

10. 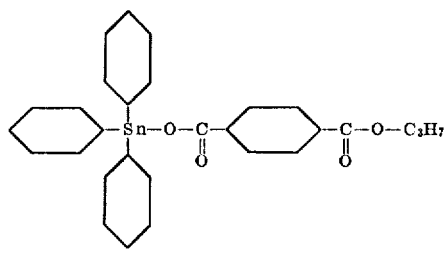

11. (C₇H₁₅)₂—Sn—[S—C₈H₁₇]₂

12. 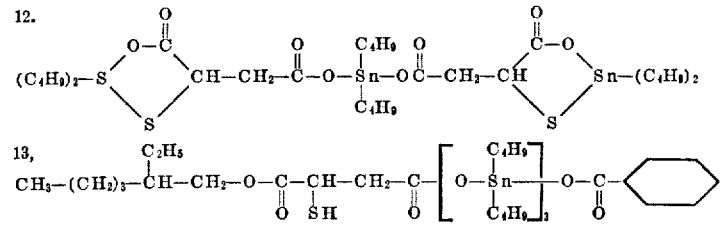

13. 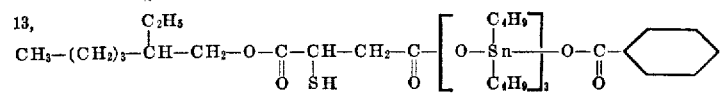

14. 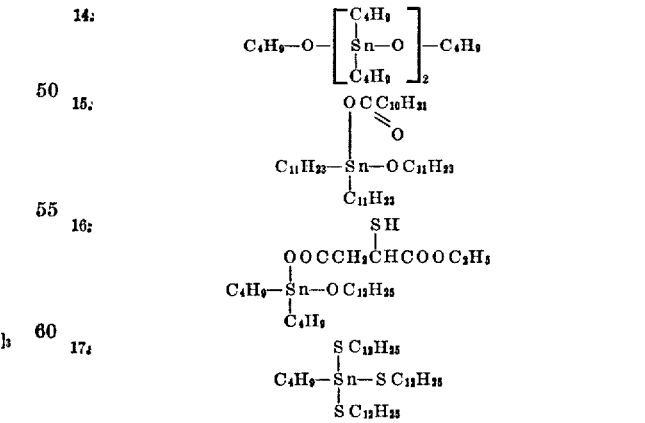

15.

16.

17.

A total of from 0.1 to 10 parts by weight of the stabilizers can be used for each 100 parts by weight of the resin. More stabilizer composition can be used, but usually no better results are obtained, and therefore such amounts are uneconomical and wasteful. The proportion of phosphite stabilizers added can be from 0.1 to 10 parts by weight but is preferably from 0.5 to 5 parts.

A small amount, usually not more than 1.5%, of a parting agent, also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene, paraffin wax and oxidized Montan wax derivatives.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet, five minutes, usually. After the mass is uniform, it is sheeted off in the usual way.

The following examples in the opinion of the inventors represent preferred embodiments of polyvinyl chloride resin compositions of their invention:

EXAMPLE I

A series of polyvinyl chloride homopolymer formulations was prepared, having the following composition:

| Plastic composition: | Parts by wt. |
|---|---|
| Dow PVC 111–4 (homopolymer of polyvinyl chloride) | 100 |
| Dioctyl phthalate | 45 |
| Isooctyl epoxy stearate | 5 |
| Phosphite as noted in Table I | 3 |

The dioctyl phthalate, isooctyl epoxy stearate and phosphite were mixed together and then blended with the polyvinyl chloride. The mixture was heated on a 2-roll mill up to 350° F., and sheeted off, and samples then were heated in an oven at 350° F., for 3½ hours to test heat stability. The discoloration was noted at 15 to 30 minute intervals, as reported in Table I below.

Phisphite D was prepared as follows:

1.1 moles of isooctyl diphenylphosphite and 0.4 mole of 4,4'-thiobis(2-tertiary butyl - 5 - methyl-phenol) were heated together in the presence of 0.5 gram of sodium hydroxide at 110 to 120° C. for three hours. The reaction mixture was then vacuum stripped to 170° C. at the water pump, obtaining 53½% of the calculated quantity of phenol. The reaction product was isooctyl phenyl 4,4'-thiobis(2-tertiary butyl-5-methylphenol) phosphite.

| Plastic composition: | Parts by weight |
|---|---|
| Pliovic DB80–V (homopolymer of polyvinyl chloride) | 100 |
| Tri-2-ethylhexyl phosphate | 40 |
| Epoxy soybean oil | 5 |
| Zinc stearate | 0.1 |
| Phosphite as noted in Table II | 3 |

The tri-2-ethylhexyl phosphate, epoxy soybean oil, zinc stearate and phosphite were mixed together and then blended with the polyvinyl chloride. The mixture was heated on a 2-roll mill up to 350° F., sheeted off, and samples heated in an oven at 350° F. for two hours to test heat stability. The discoloration was noted at 15 minute intervals, and is reported in Table II below.

TABLE II

| Time of heating (minutes) | Triphenyl phosphite | Phosphite of Example 9 [1] | Phosphite of Example 3 [2] |
|---|---|---|---|
| Initial | Colorless | Colorless | Colorless. |
| 15 | Dark red | Yellow | Yellow. |
| 30 | Dark red-brown | Amber | Amber. |
| 45 | | do | Do. |
| 60 | | do | Do. |
| 75 | | do | Do. |
| 90 | | Deep orange | Orange. |
| 105 | | do | Do. |
| 120 | | Red-brown | Orange-brown. |

[1] Tetratridecyl (4,4'-n-butylidene-bis-(2-tertiary butyl-5-methyl phenyl) diphosphite.
[2] Isooctyl-4,4'-isopropylidene-bis-phenyl polyposphite.

It is apparent from the above results that the phosphites of the invention provided superior long term stability and better color after two hours of heating at 350° F. These results are particularly outstanding because polyvinyl chloride resin compositions containing tri-2-ethylhexyl phosphate and like phosphate plasticizers are particularly difficult to stabilize.

EXAMPLE III

A series of formulations was prepared having the following composition:

| Plastic composition: | Parts by weight |
|---|---|
| Geon 101 EP (homopolymer of polyvinyl chloride) | 100 |
| Dioctyl phthalate | 50 |
| Barium cadmium laurate | 2 |
| Phosphite as noted in Table III | 1 |

TABLE I

| Time of heating (minutes) | A Triphenyl phosphite | B Isooctyl diphenyl phosphite | C Phosphite of Example 9: tetra-tridecyl 4,4'-n-butylidene-bis(2-tertiary butyl-5-methyl phenyl) diphosphite | D Isooctyl phenyl 4,4'-thiobis (2-tertiary butyl-5-methyl phenyl) phosphite | E Phosphite of Example 12: 2-ethylhexyl 2,2'-methylene-bis (4-methyl 6-1'-methylcyclo-hexyl phenyl) polyphosphite | F Phosphite of Example 3: isooctyl-4,4'-isopropylidene-bis-phenyl phosphite |
|---|---|---|---|---|---|---|
| Initial | Colorless | Colorless | Colorless | Colorless | Colorless | Colorless. |
| 15 | Yellow | Yellow | Yellow | Yellow | Yellow | Yellow. |
| 60 | Orange-brown | Deep-orange | Orange | Amber | Orange | Amber. |
| 90 | Red-brown | Orange-brown | Deep-orange | Deep-orange | Deep-orange | Orange. |
| 120 | do | Red-brown | do | do | do | Do. |
| 135 | Dark-brown | Dark-brown | do | do | do | Do. |
| 150 | | | do | do | do | Do. |
| 180 | | | do | Orange-brown | do | Do. |
| 210 | | | Red-brown | Red-brown | Red-brown | Red-brown. |

It is apparent from the above results that the phosphites of the invention provided superior long term stability and better color after 3½ hours of heating at 350° F. The fact that they were able to provide better long-term heat stability for as much as 3½ hours is quite remarkable.

EXAMPLE II

A series of formulations was prepared having the following composition:

The dioctyl phthalate, barium cadmium laurate and phosphite were mixed together and then blended with the polyvinyl chloride. The mixture was heated on a 2-roll mill up to 350° F., sheeted off, and samples then heated in an oven at 350° F. to test them for heat stability. The total heating time was four hours. The discoloration was noted at 15 minute intervals, and is reported in Table III below.

Phosphite N was prepared as follows:

Triphenyl phosphite (93 grams, 0.3 mole), 61.5 grams (0.27 mole) 2,2'-isopropylidenebisphenol, and 0.1 gram sodium metal were heated 4 hours at 135° F., during this time the 2,2'-isopropylidenebisphenol gradually dissolved. During subsequent stripping under reduced pressure the reaction mixture became much more viscous. The distillate consisted of phenol and weighed 48 grams (about 90% of the quantity equivalent to reaction of both hydroxyls of the bisphenol). After cooling to room temperature the product was a gummy solid, identified as phenyl 2,2'-isopropylidenebisphenyl polyphosphite.

The 2-ethylhexyl diphenyl phosphate, barium cadmium laurate, epoxy isooctyl stearate and phosphite were mixed together and then blended with the polyvinyl chloride. The mixture was heated on a 2-roll mill up to 350° F., sheeted off, and samples then heated in an oven for four hours at 350° F. to determine heat stability. The discoloration was noted, and is reported in Table IV below.

TABLE IV

| Time of heating (minutes) | P<br>Phosphite of Example 9: tetra tridecyl-4,4'-n-butylidene-bis-(2-tertiary-butyl-5-methyl phenyl) diphosphite | Q<br>Phosphite D of Example I: tetra isooctyl phenyl 4,4'-thiobis (2-tertiarybutyl-5-methyl phenyl) diphosphite | R<br>Phosphite of Example 12: 2-ethyl-hexyl 2,2'-methylene-bis-(4-methyl-6, 1-methyl cyclo-hexyl phenyl)-polyphosphite | S<br>Phosphite of Example 3: isooctyl-4,4'-isopropylidene-bis-phenyl phosphite |
|---|---|---|---|---|
| Initial | Colorless | Colorless | Colorless | Colorless. |
| 15 | Very pale yellow | Very pale yellow | Very pale yellow | Pale yellow. |
| 30 | do | do | do | Do. |
| 45 | do | do | do | Yellow. |
| 60 | Pale yellow | do | do | Do. |
| 75 | do | do | do | Do. |
| 90 | Yellow | Yellow | do | Amber. |
| 105 | do | do | Yellow | Do. |
| 120 | do | do | do | Do. |
| 135 | Amber | do | do | Do. |
| 150 | do | do | do | Orange. |
| 165 | Orange | do | do | Do. |
| 180 | do | do | do | Deep orange. |
| 195 | do | Amber | do | Do. |
| 210 | do | do | Orange | Orange-brown. |
| 225 | do | Orange | do | Do. |
| 240 | do | do | do | Do. |

EXAMPLE V

Example IV was repeated, employing as the resin Vinylite VYHH, a copolymer of 87% vinyl chloride and 13%

TABLE III

| Time of Heating: | J<br>Triphenyl phosphite | K<br>Phosphite of Example 9: tetra-tridecyl (4,4'-n-butylidene-bis-(2-tertiary-butyl-5-methyl phenyl)) diphosphite | L<br>Phosphite D of Example I: phenyl-isooctyl (4,4'-thiobis-(2-tertiary-butyl-5-methyl phenyl) phosphite | M<br>Phosphite of Example 12: 2-ethyl-hexyl 2,2'-methylene-bis (4-methyl 6-1'-methyl-cyclo-hexyl phenyl)-polyphosphite | N<br>Phenyl-4,4'-isopropylidene-bis-phenyl-phosphite | O<br>Phosphite of Example 3: isooctyl-4,4'-isopropylidene-bis-phenyl phosphite |
|---|---|---|---|---|---|---|
| Initial | Colorless | Colorless | Colorless | Colorless | Colorless | Colorless. |
| 15 | Very pale yellow | Very pale yellow | Very pale yellow | Very pale yellow | Very pale yellow | Very pale yellow. |
| 30 | do | do | do | do | do | Do. |
| 45 | do | do | do | do | do | Do. |
| 60 | do | do | do | do | do | Do. |
| 75 | do | do | do | do | Pale yellow | Do. |
| 90 | Pale yellow | Pale yellow | Pale yellow | Pale yellow | do | Pale yellow. |
| 105 | do | do | do | do | Yellow | Do. |
| 120 | Pale yellow | do | do | do | do | Do. |
| 135 | Yellow | do | Yellow | Yellow | do | Yellow. |
| 165 | Yellow with brown edges. | Yellow | do | do | do | Do. |
| 180 | do | do | do | do | Amber | Do. |
| 195 | Dark yellow with black edges | do | do | Yellow with slight brown edges. | do | Do. |
| 210 | Black | do | do | Yellow with brown edges. | do | Do. |
| 225 | | do | Yellow with slightly brown edges. | do | Amber with slightly black edges. | Yellow with brown edges. |
| 240 | | Yellow with brown edges. | Yellow with brown edges. | Yellow with black edges. | Amber with black edges. | Do. |

It is apparent from the above results that the phosphites of the invention provided superior long term stability and better color after two to four hours of heating at 350° F. The fact that they are able to provide better long-term heat stability for as much as four hours is quite remarkable.

EXAMPLE IV

A series of formulations was prepared having the following composition:

| Plastic composition: | Parts by weight |
|---|---|
| Dow PVC 111–4 (homopolymer of polyvinyl chloride) | 100 |
| 2-ethylhexyl diphenyl phosphate | 25 |
| Isooctyl epoxy stearate | 10 |
| Barium cadmium laurate | 2 |
| Phosphite as noted in Table IV | 1 | vinyl acetate, and 50 parts of dioctyl phthalate. Similar results were obtained.

EXAMPLE VI

A series of polyvinyl chloride homopolymer formulations was prepared, having the following composition:

| Plastic composition: | Parts by weight |
|---|---|
| DOW PVC 111–4 (homopolymer of polyvinyl chloride) | 100 |
| Diisooctyl phthalate | 45 |
| Isooctyl epoxy stearate | 5 |
| Phosphites as noted in Table 1 | 3 |

The diisooctyl phthalate, isooctyl epoxy stearate and phosphite were mixed together and then blended with the polyvinyl chloride. The mixture was heated on a 2-roll mill up to 350° F., and sheeted off, and samples then were heated in an oven at 350° F. for 3½ hours to test heat stability. The discoloration was noted at 15 to 30 minute intervals, as reported in Table VI below.

It is apparent from the above results that the phosphites of the invention containing polycyclic phenol groups in addition to the phosphite nucleus provided superior long term stability and better color after 3½ hours of heating at 350° C. The fact that they were able to provide better It is apparent from the above results that the phosphites of the invention containing polycyclic phenol groups in addition to the phosphite nucleus provided superior long term stability and better color after two hours of heating at 350° F. These results are particularly outstanding because polyvinyl chloride resin com-

TABLE VI

| Time of heating (minutes) | A Triphenyl phosphite | B Isooctyl diphenyl phosphite | C Phosphite of Example 3: 4,4'-bis-(parahydroxyphenyl) propane isooctyl phosphite | D Phosphite of Example 4: 4, 4'n-butylidene bis(2-tertiary butyl-5-methyl phenol) tridecyl phosphite | E Phosphite D of Example I: isooctyl phenyl 4,4'-thiobis (2-tertiary butyl-5-methyl phenol) phosphite | F Phosphite of Example 6: 2-ethylhexyl 2, 2'-methylene-bis (4-methyl 6-(1'-methylcyclohexyl) phenol) phosphite |
|---|---|---|---|---|---|---|
| Initial | Colorless | Colorless | Colorless | Colorless | Colorless | Colorless. |
| 15 | Yellow | Yellow | Yellow | Yellow | Yellow | Yellow. |
| 60 | Orange brown | Deep orange | Amber | Orange | Amber | Orange. |
| 90 | Red-brown | Orange-brown | Orange | Deep orange | Deep orange | Deep orange. |
| 120 | do | Red-brown | do | do | do | Do. |
| 135 | Dark brown | Dark brown | do | do | do | Do. |
| 150 | | | do | do | do | Do. |
| 180 | | | do | do | Orange-brown | Do. |
| 210 | | | Red brown | Red brown | Red brown | Red brown. | long-term heat stability for as much as 3½ hours is quite remarkable.

EXAMPLE VII

A series of formulations was prepared having the following composition:

Plastic composition: Parts by weight
  Pliovic DB80-V (homopolymer of polyvinyl chloride) _____ 100
  Tri-2-ethylhexyl phosphate _____ 40
  Epoxy soybean oil _____ 5
  Zinc stearate _____ 0.1
  Phosphite as noted in Table II _____ 3

The tri-2-ethylhexyl phosphate, epoxy soybean oil, zinc stearate and phosphite were mixed together and then blended with the polyvinyl chloride. The mixture was heated on a two-roll mill up to 350° F., sheeted off, and samples heated in an oven at 350° F. for two hours to test heat stability. The discoloration was noted at 15 minute intervals, and is reported in Table VII below.

TABLE VII

| Time of heating (minutes) | Triphenyl phosphite | Phosphite of Example 3 isooctyl 4,4'-bis-(parahydroxy phenol) propan- phosphite | Phosphite of Example 4: tridecyl 4,4'n-butylidene-bis-(2-tertiary butyl-5-methyl phenol) phosphite |
|---|---|---|---|
| Initial | Colorless | Colorless | Colorless. |
| 15 | Dark red | Yellow | Yellow. |
| 30 | Dark red-brown | Amber | Amber. |
| 45 | | do | Do |
| 60 | | do | Do |
| 75 | | do | Do. |
| 90 | | Orange | Deep orange. |
| 105 | | do | Do. |
| 120 | | Orange-brown | Red-brown. | positions containing tri-2-ethylhexyl phosphate and like phosphate plasticizers are particularly difficult to stabilize.

EXAMPLE VIII

A series of formulations was prepared having the following composition:

Plastic composition: Parts by weight
  Geon 101 EP (homopolymer of polyvinyl chloride) _____ 100
  Dioctyl phthalate _____ 50
  Barium cadmium laurate _____ 2
  Phosphite as noted in Table VIII _____ 1

The dioctyl phthalate, barium cadmium laurate and phosphite were mixed together and then blended with the polyvinyl chloride. The mixture was heated on a two-roll mill up to 350° F., sheeted off, and samples then heated in an oven at 350° F. to test them for heat stability. The total heating time was four hours. The discoloration was noted at 15 minute intervals, and is reported in Table VIII below.

Phosphite O was prapared as follows: 2-ethylhexyl dioctylphenyl phosphite (0.26 m.) was transesterified with 4,4' - thio - bis(2 - tertiary - butyl - 5 - methylphenol (0.16 m.), heating them together in the presence of 0.5 gram of sodium hydroxide at 110 to 120° C. for three hours. The reaction mixture was vacuum stripped to 170° C. at the water pump, recovering octylphenol and some 2-ethylhexanol. The reaction product was 2-ethylhexyl octylphenyl (-4,4'thio-bis(2 - tertiarybutyl-5-methylphenol)) phosphite.

TABLE VIII

| Time of heating (minutes) | J<br>Triphenyl phosphite | K<br>Tri(2,2'-bis-(parahydroxy phenyl) propane) phosphite | L<br>Phosphite of Example 4: tridecyl 4,4'-n.butylidene-bis-(2-tertiary-butyl-5-methyl phenol) phosphite | M<br>Phosphite of Example 3: isooctyl 4,4'-bis, (paraphydroxy phenyl) propane phosphite | N<br>Phosphite D of Example I: isooctyl phenyl 4,4'-thio-bis, (2-tertiarybutyl-5-methyl phenol) phosphite | O<br>2-ethylhexyl octylphenyl 4,4'-thiobis-(2-tertiary-butyl-5-methyl phenol) phosphite | P<br>Phosphite of Example 6: 2-ethylhexyl 2,2'-methylene-bis(4.methyl, 6-1'methylcyclohexyl) phenol phosphite |
|---|---|---|---|---|---|---|---|
| Initial | Cololess | Colorless | Colorless | Colorless | Colorless | Colorless | Colorless. |
| 15 | Very pale yellow. | Very pale yellow. | Very pale yellow. | Very pale yellow. | Very pale yellow. | Very pale yellow. | Very pale yellow. |
| 30 | do | do | do | do | do | do | Do. |
| 45 | do | do | do | do | do | do | Do. |
| 60 | do | do | do | do | do | do | Do. |
| 75 | do | do | do | do | do | Yellow | Do. |
| 90 | Pale yellow | do | Pale yellow | Pale yellow | Pale yellow | do | Pale yellow. |
| 105 | do | Yellow | do | do | do | do | Do. |
| 120 | do | do | do | do | do | do | Do. |
| 135 | Yellow | do | do | Yellow | Yellow | Amber | Yellow. |
| 165 | Yellow with brown edges. | do | Yellow | do | do | do | Do. |
| 180 | do | Amber | do | do | do | do | Do. |
| 195 | Dark yellow with black edges. | do | do | do | do | Amber with brown edges. | Yellow with slight brown edges. |
| 210 | Black | do | do | do | do | do | Yellow with brown edges. |
| 225 | | Amber with slightly black edges. | do | Yellow with brown edges. | Yellow with slightly brown edges. | Amber with black edges. | Do. |
| 240 | | Amber with black edges. | Yellow with brown edges. | do | Yellow with brown edges | Black | Yellow with black edges. |

It is apparent from the above results that the phosphites of the invention containing polycyclic phenol groups in addition to the phosphite nucleus provided superior long term stability and better color after two to four hours of heating at 350° F. The fact that they are able to provide better long-term heat stability for as much as four hours is quite remarkable.

The 2-ethylhexyl diphenyl phosphate, barium cadmium laurate, epoxy isooctyl stearate and phosphite were mixed together and then blended with the polyvinyl chloride. The mixture was heated on a 2-roll mill up to 350° F., sheeted off, and samples then heated in an oven for four hours at 350° F. to determine heat stability. The discoloration was noted, and is reported in Table IX below.

TABLE IX

| Time of heating (minutes) | Q<br>Tri-4,4'-bis(parahydroxy phenyl) propane phosphite | R<br>Phosphite of Example 4: tridecyl 4,4'n-butylidene-bis-(2 tertiary butyl-5-methyl phenol) phosphite | S<br>Phosphite D of Example 1: isooctyl phenyl 4,4'-thio bis(2-tertiary-butyl-5-methyl phenol) phosphite | T<br>Phosphite of Example 6: 2-ethylhexyl 2,2'-methylene-bis-(4-methyl-6,1-cyclohexyl) phenol phosphite |
|---|---|---|---|---|
| Initial | Colorless | Colorless | Colorless | Colorless. |
| 15 | Pale yellow | Very pale yellow | Very pale yellow | Very pale yellow. |
| 30 | do | do | do | Do. |
| 45 | Yellow | do | do | Do. |
| 60 | do | Pale yellow | do | Do. |
| 75 | do | do | do | Do. |
| 90 | Amber | Yellow | Yellow | Do. |
| 105 | do | do | do | Yellow. |
| 120 | do | do | do | Do. |
| 135 | do | Amber | do | Do. |
| 150 | Orange | do | do | Amber. |
| 165 | do | Orange | do | Do. |
| 180 | Deep orange | do | do | Do. |
| 195 | do | do | Amber | Do. |
| 210 | Orange-brown | do | do | Orange. |
| 225 | do | do | Orange | Do. |
| 240 | do | do | do | Do. |

EXAMPLE IX

A series of formulations was prepared having the following composition:

Plastic composition: Parts by weight
Dow PVC 111–4 (homopolymer of polyvinyl chloride) _____ 100
2-ethylhexyl diphenyl phosphate _____ 25
Isooctyl epoxy stearate _____ 10
Barium cadmium laurate _____ 2
Phosphite as noted in Table IX _____ 1

It is apparent from the above results that the phosphites of the invention containing polycyclic phenol groups with free phenolic hydroxyl groups in addition to the phosphite nucleus provided superior long-term stability and better color after two to four hours of heating at 350° F. The fact that they are able to provide better long-term heat stability for as much as four hours is quite remarkable, because resin compositions containing phosphate plasticizers are particularly difficult to stabilize.

EXAMPLE X

To show the highly effective stabilizing activity of the preferred compounds of the present invention, the following tests were made.

A plasticized resin formulation of a standard type was prepared having the following composition:

| Composition: | Parts by weight |
|---|---|
| Homopolymer of polyvinyl chloride (Pliovic DB80-V) | 100 |
| Phosphate plasticizer (TOF) (tri 2-ethylhexyl phosphate) | 45 |
| Barium cadmium laurate | 2 |
| (Drapex 6.8) Epoxidized soybean oil | 5 |
| Phosphite ester as noted in Table X | 3 |

The phosphite ester, phosphate plasticizer, the metal soaps and the Drapex 6.8 epoxy soybean oil were mixed together and then blended with the polyvinyl chloride. The mixture was heated on a two-roll mill up to 350° F. to test heat stability. The discoloration was noted at 15 minute intervals throughout the test as reported in Table X below.

Similarly, the preferred compounds of this invention having aliphatic groups in the phosphite molecule are even better than those without the aliphatic group.

EXAMPLE XI

The following tests were conducted to show the stabilizing effectiveness of various phosphites containing different Y-linking groups in the bicyclic phenolic groups (Ar—Y—Ar) of this invention. The same resin formulation was prepared as in Example X using the phosphite stabilizers set forth in the Table XI below. Controls A and B are repeated.

TABLE XI

| Time of heating (minutes) | Control Example A, tricresyl phosphite | Phosphite of control B: (examples 24 to 27) | AA — Phosphite of Example 8: transesterification product of octyl diphenyl phosphite and 4,4'-methylene-bis(2-t-butyl-6-methyl phenol) | BB — Phosphite of Example 28: transesterification product of octyl diphenyl phosphite and oxodiphenol | CC — Phosphite of Example 30: transesterification of octyl diphenyl phosphite and 4,4'-cyclohexylidene bisphenol |
|---|---|---|---|---|---|
| Initial | Colorless | Colorless | Colorless | Colorless | Colorless. |
| 15 | Light yellow | Very light yellow | Very light yellow | Very light yellow | Very light yellow. |
| 30 | Orange | Light yellow | Light yellow | Light yellow | Yellow. |
| 45 | Dark orange | do | do | Yellow | Do. |
| 60 | do | Yellow | Yellow | do | Do. |
| 75 | Very dark orange | do | do | do | Do. |
| 90 | Almost black | do | do | do | Charred dark yellow. |
| 105 | Black | Charred | do | Yellow charred corners | Black. |
| 120 | | Black | Almost all black | Black | |

EXAMPLE XII

A resin formulation was prepared according to Example X containing the phosphites set forth in Table XII, below. After mixing the resin on a two-roll mill, the sheets were molded at 350° C. for five minutes at high pressure to form pressed-polished sheets. The color is noted in

TABLE X

| Time of heating (minutes) | U — Control A: tricresyl phosphite, 3 parts | V — Phosphite of control B: (Examples 24 to 27) | W — 24 | X — 25 | Y — 26 | Z — 27 |
|---|---|---|---|---|---|---|
| Initial | Colorless | Colorless | Colorless | Colorless | Colorless | Colorless. |
| 15 | Very light yellow | Very light yellow | Very light yellow | Very light yellow | Very light yellow | Very light yellow. |
| 30 | Orange | Yellow | Yellow | Yellow | Yellow | Yellow. |
| 45 | Ruby | Orange | do | do | do | Do. |
| 60 | do | do | do | do | do | Do. |
| 75 | do | Ruby | do | do | do | Do. |
| 90 | Black | do | Orange | Orange | Light orange | Do. |
| 105 | | do | do | do | Orange | Charred. |
| 120 | | Black | Black | Black | Black | Black. |

As shown by the above results, the phosphites containing the groups Ar—Y—Ar attached to each phosphite group are far superior stabilizers to Control Example A, containing only a monocyclic phenolic compound.

Table XII. Control C was prepared following the procedure of Example 8, but substituting 4,4'-bis(2-tert-butyl-6-methyl-phenol); 50% of the theoretical amount of phenol was stripped out.

TABLE XII

| | Phosphite | Color of pressed polished sheet |
|---|---|---|
| | Control A | Tricresyl phosphite | Colorless. |
| DD | Control B | (Examples 24 to 27) transesterification product of tricresyl phosphite and 4,4'-isopropylidene bisphenol. | Do. |
| EE | Control C | Transesterification product of octyl phenyl phosphite and 4,4'-bis(2-tert-butyl-6-methyl-phenol). | Yellow. |
| FF | Phosphite of Example 8 | Transesterification product of octyl diphenyl phosphite and 4,4'-methylene-bis(2-t-butyl-6-methylphenol). | Colorless. |
| GG | Phosphite of Example 28 | Transesterification product of octyl diphenyl phosphite diphenyl phosphite and oxidiphenol. | Do. |
| HH | Phosphite of Example 30 | Transesterification product of octyl diphenyl phosphite and 4,4'-cyclohexylidene bisphenol. | Do. |

The above test results provide further evidence that the products falling within the present invention are superior in their stabilizing activity for polyvinyl chloride resins than even closely related materials which are outside of the scope of the present invention. For example, the compound of Control C differs from the product of Example 8, only in the absence of a linking Y group in the bisphenol radical. However, Control C has a serious initial discoloration in the polyvinyl chloride resins containing the phosphite produced.

The organic phosphites of the invention also are effective stabilizers for olefin polymers such as polyethylene, polypropylene, polybutylene, and higher polyolefins.

Olefin polymers on heating and working in air undergo degradation, resulting in a loss in melt viscosity. This problem is particularly serious with polypropylene. The organic phosphites of the invention are effective in overcoming this reduction in melt viscosity, and in this respect represent an extension upon U.S. application Ser. No. 712,306 filed Jan. 31, 1958 now U.S. Pat. 3,015,644.

The organic phosphites can be employed with any olefin polymer, including low-density polyethylene, high-density polyethylene, polyethylenes prepared by the Ziegler process, polypropylenes prepared by the Ziegler process, and by other polymerization methods from propylene, poly (butene-1), poly(ptene-1), poly(3-methylbutene-1), poly (4-methyl-pentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the phosphites of the invention. The tem "olefin polymer" encompasses both homopolymers and copolymers.

The phosphite is incorporated with the olefin polymer alone or in conjunction with other olefin polymer stabilizers. A number of such stabilizers are disclosed in pending U.S. applications Ser. Nos. 762,681, filed Sept. 23, 1958, now abandoned, 765,721 now U.S. Pat. 3,149,093 and 60,792 filed Oct. 6, 1960, now abandoned and any of these can be employed as described herein. The phosphite can be added to an olefin polymer such as polypropylene or polyethylene which has not been degraded to a significant degree, and if it is added at this stage, it is capable of holding the rate of reduction in melt viscosity to a very low level. If the stabilizer or stabilizer combination is added to the olefin polymer at a stage of degradation, it is capable of holding the rate of reduction in melt viscosity thereafter to a very low level.

A sufficient amount of the stabilizer is used to hold the change in melt viscosity with time at the hot-working temperature to the limit required for working with the equipment at hand. Very small amounts are usually adequate. Amounts within the range from about 0.005 to about 5% by weight of the olefin polymer are satisfactory. Preferably, from 0.1 to 1% is employed for optimum stabilization. There is no real upper limit on the amount of stabilizer but inasmuch as these compounds are expensive, it is usually desirable to use the minimum necessary to give the required stabilization.

After the polypropylene has been worked so that its melt viscosity has been reduced to the desired range, the stabilizer is incorporated in the polymer in suitable mixing equipment, such as a mill or a Banbury mixer. Working and blending is continued until the mixture is substantially uniform. The resulting composition is then removed from the mixing equipment, and reduced to the size and shape desired for marketing or use.

The following examples represent embodiments of polypropylene stabilized with phosphites in accordance with the invention:

EXAMPLE XIII

A stabilized polypropylene composition was prepared using as the phosphite stabilizer the phosphite of Example 9, together with a metal salt, zinc 2-ethyl hexoate. The phosphite, phenol and metal salt were blended together to yield a stabilizer of the following composition:

| Stabilizer composition: | Parts by weight |
|---|---|
| Tetra tridecyl - 4,4'-n-butylidene-bis-(2-tertiary-butyl-5-methylphenyl)diphosphite | 375 |
| Zinc 2-ethylhexoate | 125 |

The stabilizer blend was dispersed by hand-stirring in powdered, previously unstabilized polypropylene (Pro-Fax 6501, reduced specific viscosity (RSV) 3.0, melt index 0.4, ASTM D1238–57T at 190° C.) in an amount of 0.5% stabilizer by weight of the resin. The mixture was placed on a 2-roll mill and fluxed for five minutes at 170±2° C. Pieces cut from the milled sheet were used in the standard tests described below. The standard sample used in testing was 200 g., except for the Brabender Plastograph, which was 35 g. The stabilizers were incorporated as described in the working example and milled to a sheet. Pieces cut from the milled sheet were then used in the test procedures.

Brabender plastograph (reduction in melt viscosity)

This instrument is essentially a heated sigma-blade mixer in which the torque applied to the blades at 60 r.p.m. is continuously measured and plotted on a chart as kg.-cm. of torque. The bowl is maintained at 193° C. The charge is 35 g. polypropylene. Temperature of the plastic is 205–215° C., owing to frictional heat build-up.

Oven test, 205° C. (heat stability)

Small squares cut from a milled sheet are exposed in a forced-draft air oven lying flat on aluminum foil. Samples are removed at 15 minute intervals and examined for loss of shape, flow-out, or melting, which constitute failure. Color is noted at failure.

Compression molding, 190° C. (resistance to embrittlement and loss of plasticity)

Pieces cut from a milled sheet are compression-molded at 190° C. for five minutes to give 6 x 6 inch slabs 20 mils (about 0.5 mm.) or 75 mils thick. Plasticity and color are then noted.

Heat ageing, 150° C. oven (heat stability of molded samples)

Molded samples made as above are heated flat on aluminum foil in an air circulating oven at 150° C. Samples are removed daily and examined for cracking or powdering, either of which constitutes failure. Color is noted at the end of two days, if the sample has not yet failed.

Weatherometer (resistance to light deterioration)

The molded samples were held in a weatherometer at 51° C. black panel temperature, and noted every 16⅔ hours for development of cracking, either of which constitutes failure. Color is noted at the end of fifty hours.

Compression molding at high temperature, 287° C. (550° F.) (resistance to embrittlement and loss of plasticity at high temperatures)

Moldings are made as above, held in the mold thirty minutes at 287° C. (550° F.), cooled and examined for color and plasticity. Unstabilized as well as overstabilized formulations crack and discolor under these conditions.

Brabender plastograph, 193° C., 60 r.p.m.

| Stabilizer system: | (Kg.-cm. of torque) |
|---|---|
| After 5 minutes working | 1300 |
| After 15 minutes working | 1260 |
| After 25 minutes working | 1160 |
| Color, 25 minutes | Light gray |

Oven test, 205° C.

Stabilizer system:
  Time to failure _____ 2 hours.
  Initial color _____ Colorless.
  Color at failure _____ Light gray.

Compression molding, 6 x 6 inch slabs, 20 and 75 mils thick

Stabilizer system:
  Condition _____ Good.
  Color _____ Colorless.

Heat ageing: molded 20 mil specimens, 150° C.

Stabilizer system:
  Days to failure _____ 6½.
  Color, 2 days _____ Light gray.

Weatherometer exposure, 20 mil specimens, 51° C. black panel temperature

Stabilizer system:
  Hours to failure _____ 120
  Color, 50 hours _____ Colorless.

High-temperature compression molding, 287° C.

Stabilizer system:
  Condition _____ Good.
  Color _____ Colorless.

EXAMPLE XIV

Two stabilized polypropylene compositions were prepared. 375 parts by weight Phosphite D stabilizer of Example 1 was blended with 125 parts of zinc 2-ethylhexoate to yield a stabilizer composition.

This composition was blended with polypropylene (Pro-Fax 6501) in the amount given in the table, and then tested by the standard heat-ageing test in comparison with a similar composition containing the blend, with the addition of dilauryl thiodipropionate.

TABLE XIV

| Stabilizer system | Stabilizer composition | Dilauryl thiodipropionate | Heat ageing, molded 20 mil specimens, 150° C. | |
|---|---|---|---|---|
| | | | Days to failure | Color, 2 days |
| A | 0 | 0 | 1 | Colorless. |
| B | 0.25 | 0 | 3 | Do. |
| C | 0.50 | 0 | 6 | Do. |
| D | 1.00 | 0 | 8 | Do. |
| E | 0 | 0.3 | 3 | Do. |
| F | 0 | 1 | 3 | Do. |
| G | 0.10 | 0.3 | 4 | Do. |
| H | 0.25 | 0.3 | 3 | Do. |
| I | 0.45 | 0.1 | 15 | Do. |
| J | 0.45 | 0.2 | 26 | Do. |
| K | 0.45 | 0.3 | 34 | Do. |
| L | 0.35 | 0.5 | 40 | Do. |
| M | 0.55 | 0.3 | 37 | Do. |
| N | 0.75 | 0.3 | 34 | Do. |

The very considerable improvement in resistance to ageing at 150° C. due to the dilauryl thiodipropionate is evident from the data. Reduction in melt viscosity was small in 45 minutes, and heat stability, resistance to embrittlement and loss of plasticity at low and high temperatures, and resistance to light deterioration, are all rated as excellent.

EXAMPLE XV

Two stabilized polypropylene compositions were prepared, using a blend of phosphite, phenol and metal salt, 4,4' - n - butylidene - bis(2 - tertiary - butyl - 5 - methylphenol), 2 - ethylhexyl - 2,2'-methylene-bis(4-methyl-6,1'-methylcyclohexyl) phenyl phosphite, and zinc 2-ethylhexoate, of the following composition:

Stabilizer composition: Parts by weight
  4,4' - n - butylidene - bis(2 - tertiary - butyl-5-methylphenol) _____ 100
  2 - ethylhexyl - 2,2' - methylene - bis(4 - methyl-6,1'-methylcyclohexyl) phenyl phosphite ____ 275
  Zinc 2-ethylhexoate _____ 125

This composition was blended with polypropylene (Pro-Fax 6501) in an amount of 0.6%, and then tested by the standard heat-ageing test in comparison with a similar composition containing the blend in an amount of 0.6%, with the addition of 0.3% dilauryl thiodipropionate. The composition without the dilauryl thiodipropionate was stable for six days, and the composition with the thiodipropionate, for 24 days. Both compositions were colorless at the end of two days.

Reduction in viscosity was small in 45 minutes and heat stability, resistance to embrittlement and loss of plasticity at low and high temperature, and resistance to light deterioration, are all rated as excellent.

Having regard to the foregoing disclosure, the following is claimed as the inventive and patentable embodiments thereof:

1. An organic phosphite having in the molecule at least one polycarbocyclic phenolic group

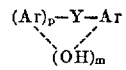

for each phosphite group, said polycarbocyclic phenolic group having from one to about thirty carbon atoms per phenolic hydroxyl group, and at least one aliphatic or cycloaliphatic group, the phosphite having the formula:

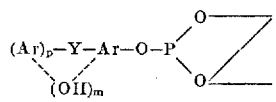

wherein Ar is a carbocyclic aromatic nucleus and at least one Ar nucleus has a phenolic hydroxyl group (OH); $m$ has a value of from one to about two; $p$ has a value from two to four; and Z is taken in sufficient number to satisfy the valences of the two phosphite oxygen atoms and is selected from the group consisting of hydrogen; monovalent and bivalent saturated aliphatic, aromatic and saturated cycloaliphatic hydrocarbon radicals having from about one to about thirty carbon atoms; and monovalent and bivalent phenolic groups having from one to about thirty carbon atoms per phenolic hydroxy group, and selected from the group consisting of $(HO)_m$—Ar— and

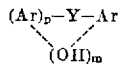

which in polymeric phosphites are linked to additional phosphite groups, such polymeric phosphites containing at least one aliphatic or cycloaliphatic group having from one to about thirty carbon atoms for each one to ten phosphite groups; and Y is a linking group selected from the group consisting of trivalent, tetravalent and pentavalent aliphatic, and aliphatic aromatic hydrocarbon groups, attached to each Ar group through a carbon atom not a member of an aromatic ring, and such aliphatic radicals including carboxylic acid ester groups, having from one to about thirty-three carbon atoms.

2. An organic phosphite according to claim 1 wherein all of the organic radicals are hydrocarbon radicals.

3. An organic phosphite according to claim 1 having from two to ten phosphite groups in a linear chain.

4. An organic phosphite according to claim 1 having from two to ten phosphite groups in a cross-linked polymer.

5. An organic phosphite according to claim 1 containing only aliphatic and $(Ar)_p$—Y—Ar radicals.

6. An organic phosphite according to claim 1 containing only cycloaliphatic and $(Ar)_p$—Y—Ar radicals.

7. An organic polyphosphite in accordance with claim 1 having the formula

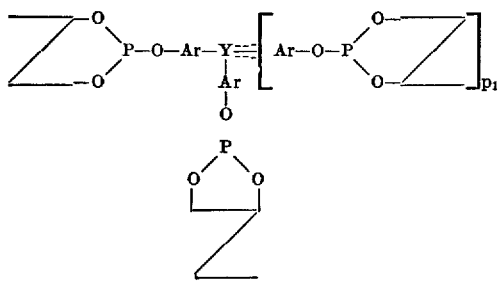

wherein Z is selected from the group consisting of hydrogen, aliphatic, cycloaliphatic, aromatic, and Ar—Y—Ar groups, and corresponding radicals cross-linking to another phosphite group oxygen atom, and $p_1$ is a number from one to four.

8. An organic phosphite in accordance with claim 1 wherein the $(Ar)_p$—Y—Ar radical has the formula

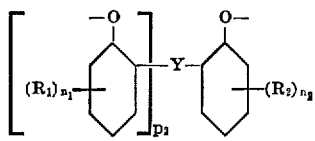

wherein $R_1$ and $R_2$ are selected from the group consisting of saturated hydrocarbon and phenolic hydroxyl radicals, $n_1$ and $n_2$ are integers from zero to four, and $p_2$ is an integer from two to four.

9. An organic phosphite according to claim 1 having one hydrogen attached to each phosphite group.

10. An organic phosphite according to claim 1 wherein Ar is a benzene nucleus.

11. An organic phosphite in accordance with claim 1 wherein Y is an alkylene group.

12. An organic phosphite in accordance with claim 1 wherein Y is an alkylidene group.

13. An organic phosphite according to claim 1 where Y is aliphatic.

14. An organic phosphite according to claim 1 wherein Y includes a carboxylic acid ester group.

15. An organic phosphite according to claim 1 wherein $(Ar)_p$—Y—Ar is 1,1,3-tris(2'-methyl-4'-hydroxy-5'-butylphenyl)butane.

References Cited

UNITED STATES PATENTS 3,516,963    6/1970    Friedman _____ 260—927 RX

JOSEPH REBOLD, Primary Examiner

A. H. SUTTO, Assistant Examiner

U.S. Cl. X.R.

252—400; 260—243 R, 248 R, 294.7 R, 302 E, 329 P, 347.8, 429.7, 982

UNITED STATES PATENT OFFICE
CERTIFICATE OF CORRECTION

Patent No. 3,655,832　　　　　Dated April 11, 1972

Inventor(s) Otto S. Kauder et al

It is certified that error appears in the above-identified patent and that said Letters Patent are hereby corrected as shown below:

Column 4, line 58 : "of" should be --to--

Column 6, line 41
Formula V

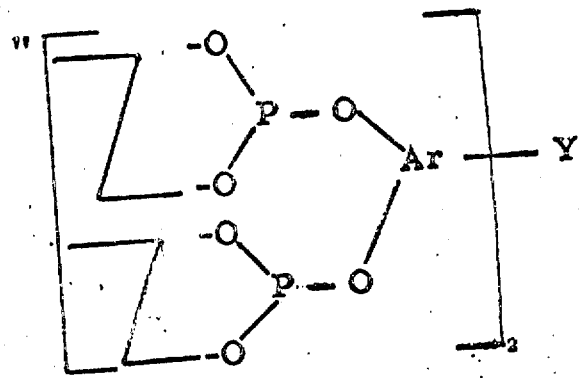

" should be

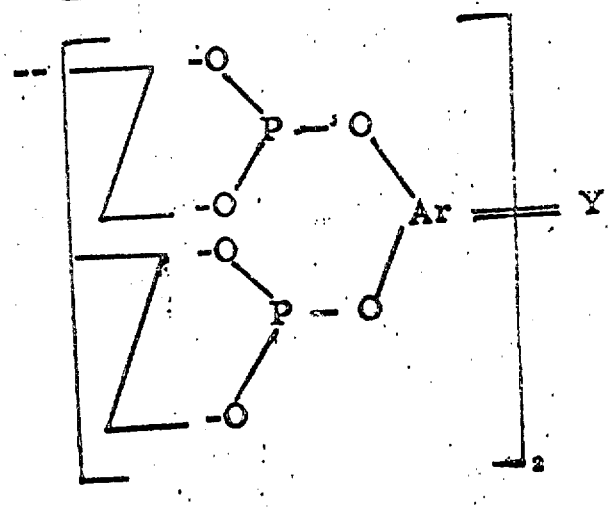

Columns 9 & 10, Formula 1.
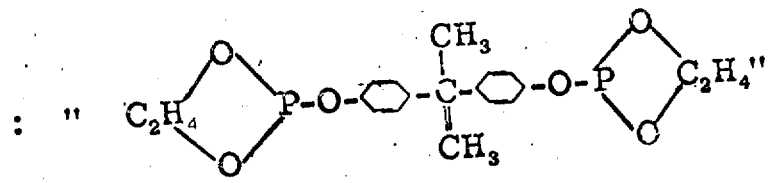
should be
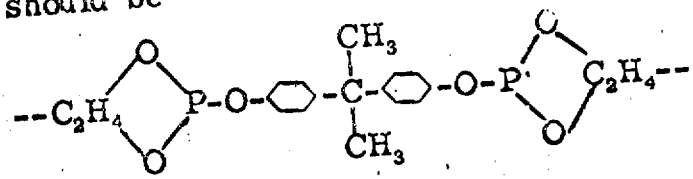
Column 10, Formula 3.
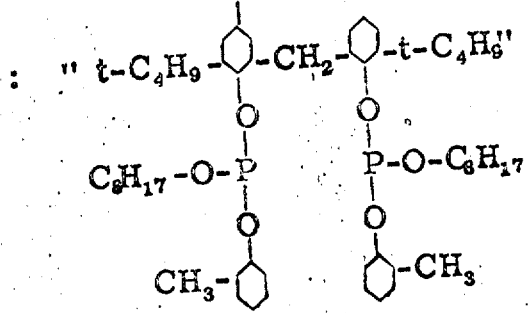
should be
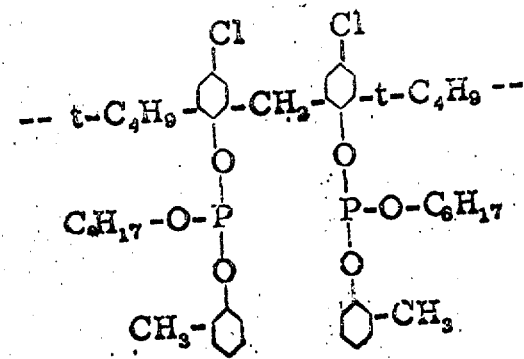

Columns 9 & 10,
Formula 4.
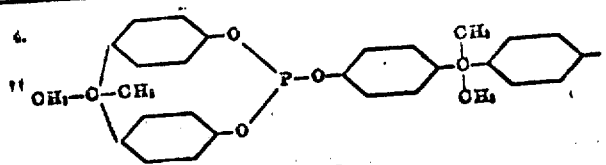 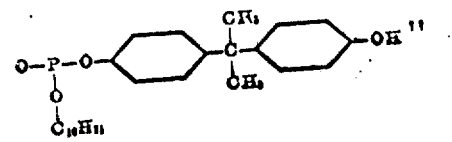
should be
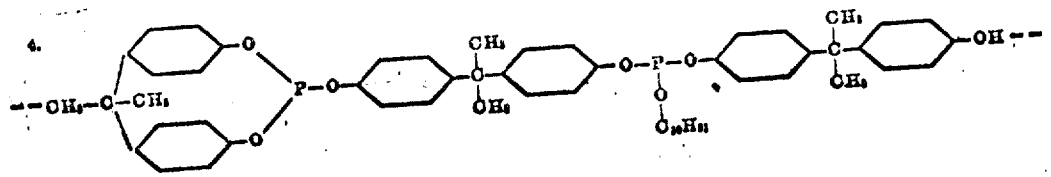

Column 11, Example 11: last benzene ring  " should be
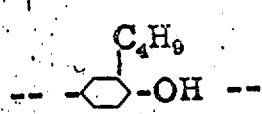
Column 13, Example 16:
" 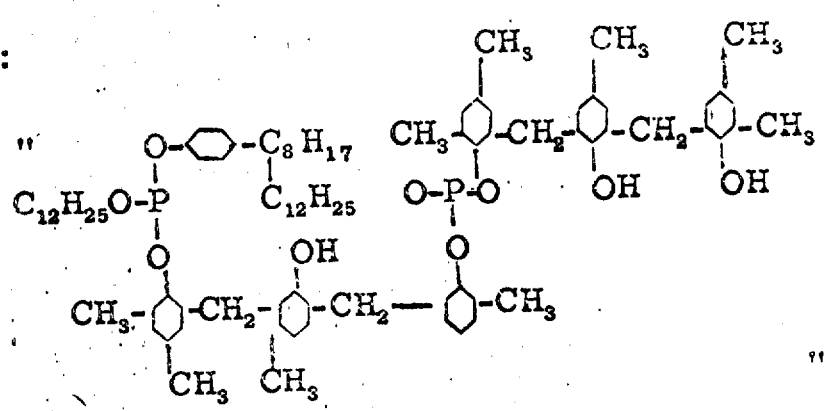 "
should be
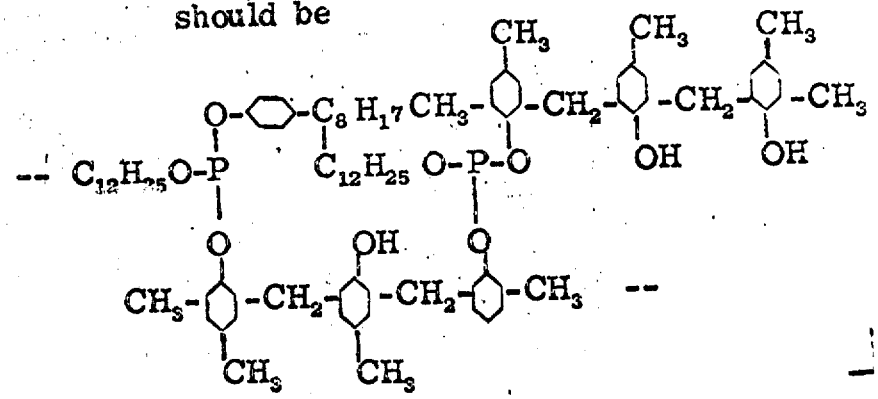

Column 13, Example 17 : " 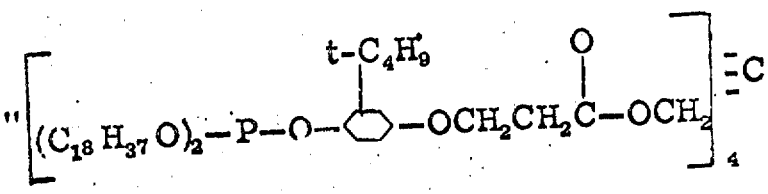
should be
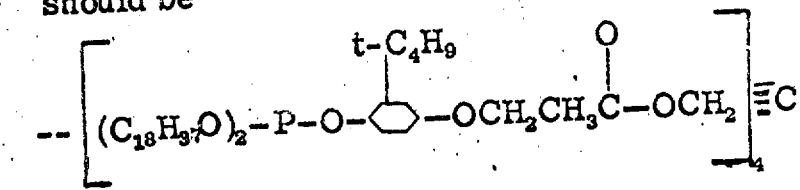
Column 13, Example 19 : "9." should be --19.--

Columns 15 & 16 :
Formula 20
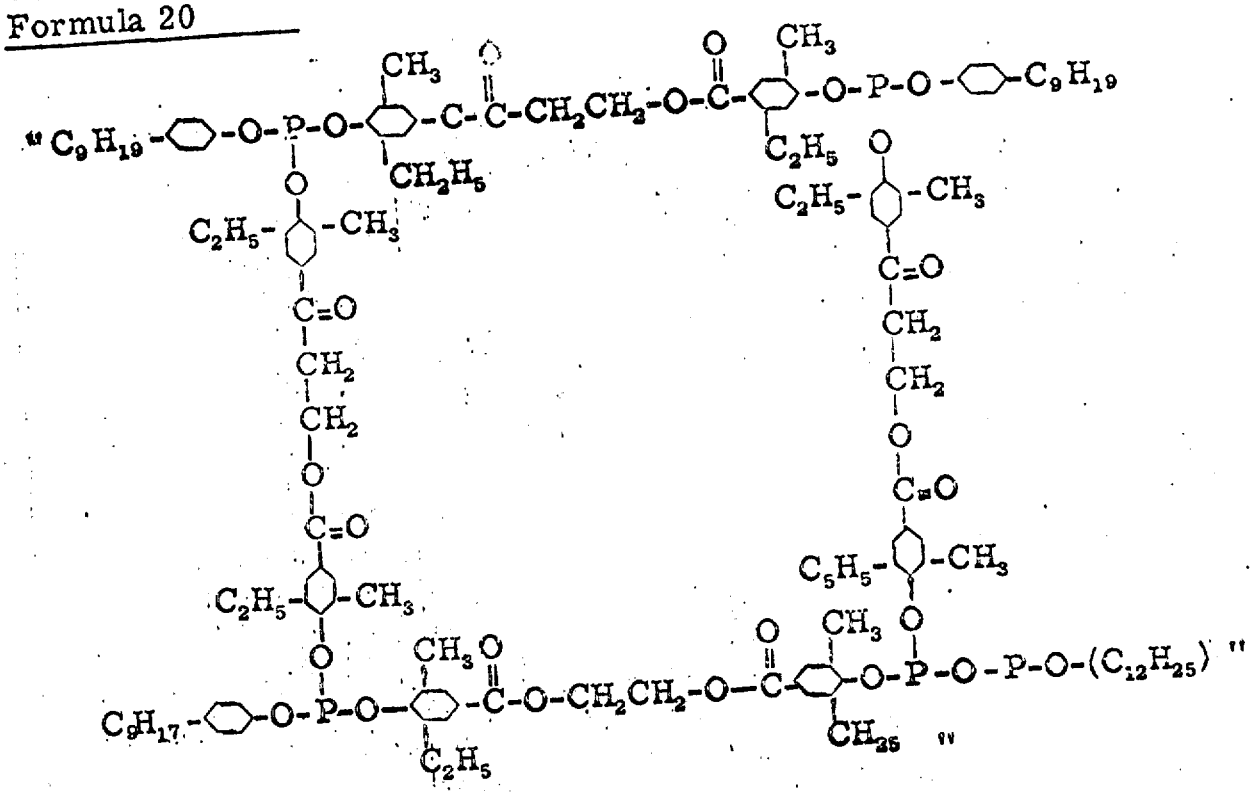
SHOULD BE

Columns 15 & 16 :
Formula 20
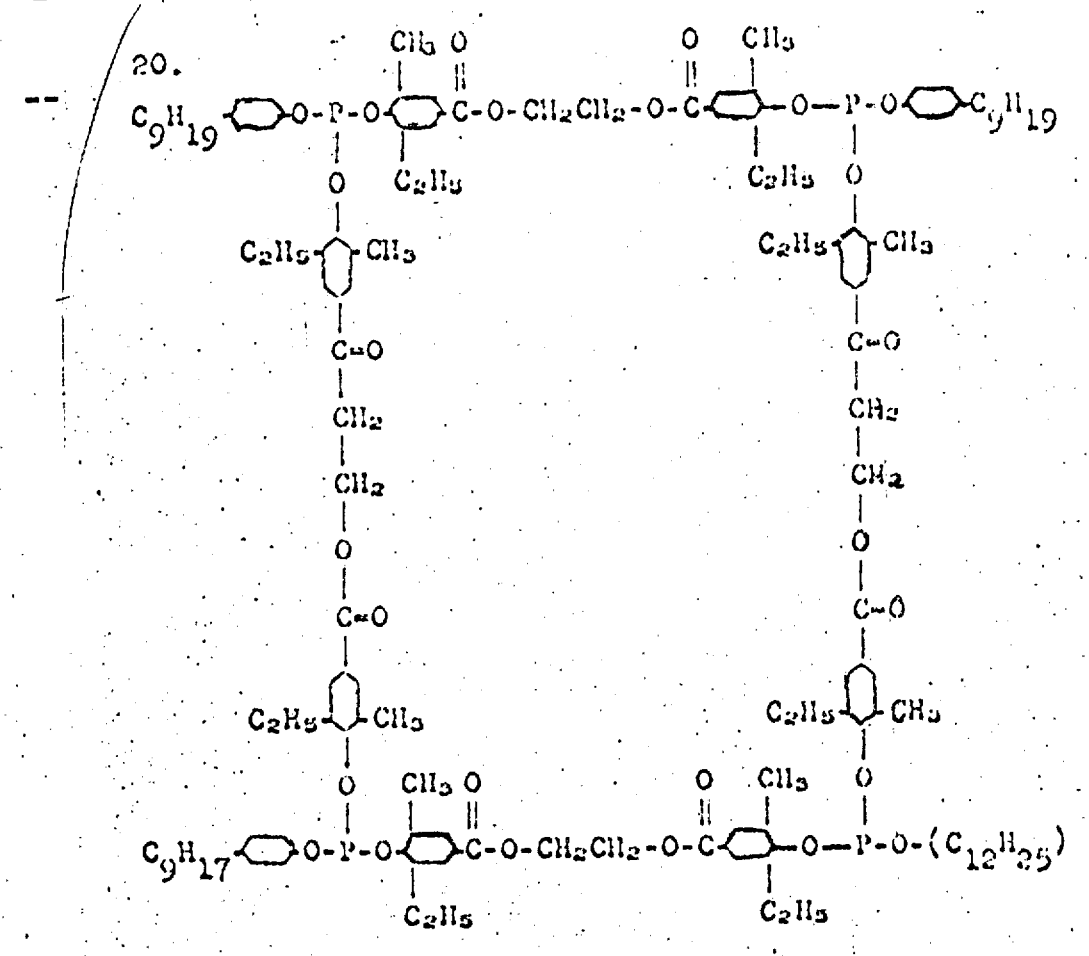

Column 17, Example 29 : " 29. 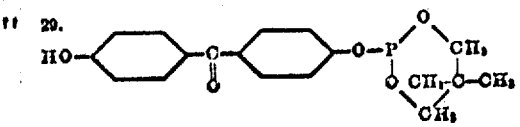 "
should be
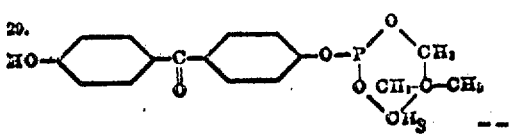
Column 18, Example 33 : " 33. 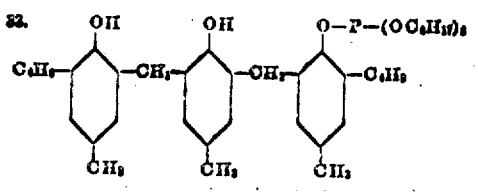 "
should be
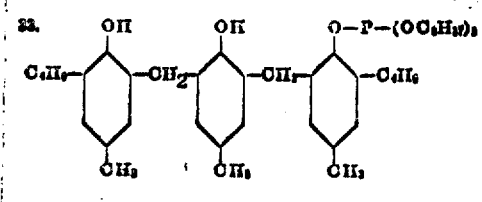

Column 19, line 17 : "degrees" should be --degree--

Column 20, line 40 : "6(1'-methyl-" should be --6-(1'methyl- --

Column 20, line 43 : "(2'-hydroxy3'-t-" should be --(2'-hydroxy-3'-t --

Column 22, line 7 : "methylcycloxy" should be --methylcyclohexyl--

Column 22, line 59 : "phosphate" should be --phosphite--

Column 23, line 12 : "ebullisoscopic" should be --ebullioscopic--

Column 23, line 72 : "benzyl" should be --benzyl)- --

Column 24, line 37 : "form" should be --from--

Column 27, line 1 : "unsaturation" should be --unsaturated--

Column 27, line 2 : "crucic" should be --erucic--

Column 28, line 60; "therin" should be --therein--

Column 30, Example 15 : " 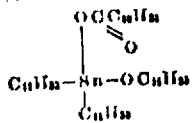 "

should be

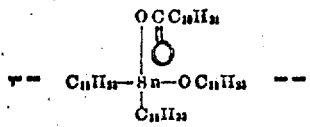

| | |
|---|---|
| Column 31, line 37 | : "Phisphite" should be --Phosphite-- |
| Column 32, Footnote [1] | : add end parenthesis ) after "phenyl)" |
| Column 32, Footnote [2] | : "polyposphite" should be --polyphosphite-- |
| Column 36, line 64 | : "prapared" should be --prepared-- |
| Columns 37 & 38, Table VIII M | : "paraphydroxy" should be --parahydroxy-- |
| Columns 37 & 38, Table VIII, K Test 75 | : "do" should be --pale yellow-- |
| Columns 37 & 38, Table VIII, K Test 90 | : "very pale yellow" should be --pale yellow-- |

Column 41, line 26 : "poly(ptene-1)" should be --poly(pentene-1)--

Column 41, line 35 : "tem" should be --term--

Column 43, line 46
Table XIV - Heading : "Dilaury" should be --Dilauryl--

Column 44, line 49 : "hydroxy" should be --hydroxyl--

Signed and sealed this 22nd day of May 1973.

(SEAL)
Attest:

EDWARD M. FLETCHER, JR.
Attesting Officer

ROBERT GOTTSCHALK
Commissioner of Patents